United States Patent
Lee et al.

(10) Patent No.: US 10,206,069 B2
(45) Date of Patent: Feb. 12, 2019

(54) ELECTRONIC DEVICE, SERVER, AND METHOD FOR DETERMINING PRESENCE OR ABSENCE OF USER WITHIN SPECIFIC SPACE

(71) Applicant: SAMSUNG ELECTRONICS CO., LTD., Suwon-si, Gyeonggi-do (KR)

(72) Inventors: Yonggwon Lee, Anyang-si (KR); Abhishek Kumar, Seoul (KR); Dongkeon Kong, Suwon-si (KR); Hyejung Cho, Anyang-si (KR); Jaehong Kim, Yongin-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/819,233

(22) Filed: Nov. 21, 2017

(65) Prior Publication Data
US 2018/0146343 A1 May 24, 2018

(30) Foreign Application Priority Data
Nov. 24, 2016 (KR) .................. 10-2016-0157177

(51) Int. Cl.
*H04W 4/02* (2018.01)
*H04W 4/029* (2018.01)
*A63F 13/21* (2014.01)
*A63F 13/35* (2014.01)
*H04B 17/318* (2015.01)
(Continued)

(52) U.S. Cl.
CPC ............. *H04W 4/029* (2018.02); *A63F 13/21* (2014.09); *A63F 13/35* (2014.09); *G06F 3/147* (2013.01); *H04B 17/318* (2015.01); *G06F 3/041* (2013.01); *G09G 2370/16* (2013.01)

(58) Field of Classification Search
CPC ....... H04W 4/029; H04W 4/028; G06F 3/147; G06F 3/041; A63F 13/21; A63F 13/35; H04B 17/318
See application file for complete search history.

(56) References Cited

U.S. PATENT DOCUMENTS 9,131,462 B1 9/2015 Verghese et al.
9,316,738 B2 4/2016 Lee et al.
(Continued)

FOREIGN PATENT DOCUMENTS

KR 10-2016-0034138 3/2016

OTHER PUBLICATIONS

Search Report dated Mar. 8, 2018 in counterpart International Patent Application No. PCT/KR2017/013185.

*Primary Examiner* — Chuong A Ngo
(74) *Attorney, Agent, or Firm* — Nixon & Vanderhye, P.C.

(57) ABSTRACT

An example method for determining, at an electronic device, a presence or absence of the electronic device in a specific space may include estimating a current location based on strength of signals received from a plurality of wireless communication devices; correcting the estimated location by using movement information acquired through a sensor to generate a first corrected location; correcting the first corrected location by using information about a boundary area of a predefined presence determination area to generate a second corrected location; and determining the presence or absence in the presence determination area, based on the second corrected location.

20 Claims, 25 Drawing Sheets

(51) Int. Cl.
*G06F 3/147* (2006.01)
*G06F 3/041* (2006.01)

(56) References Cited

U.S. PATENT DOCUMENTS

| | | | |
|---|---|---|---|
| 2003/0189498 A1* | 10/2003 | Kakihara | G06Q 30/0284 340/928 |
| 2015/0133143 A1 | 5/2015 | Huang et al. | |
| 2015/0198708 A1 | 7/2015 | Khan et al. | |
| 2015/0293647 A1 | 10/2015 | Katabi et al. | |
| 2015/0312719 A1* | 10/2015 | Cho | H04W 4/027 455/456.5 |
| 2016/0011294 A1 | 1/2016 | Kim et al. | |

* cited by examiner

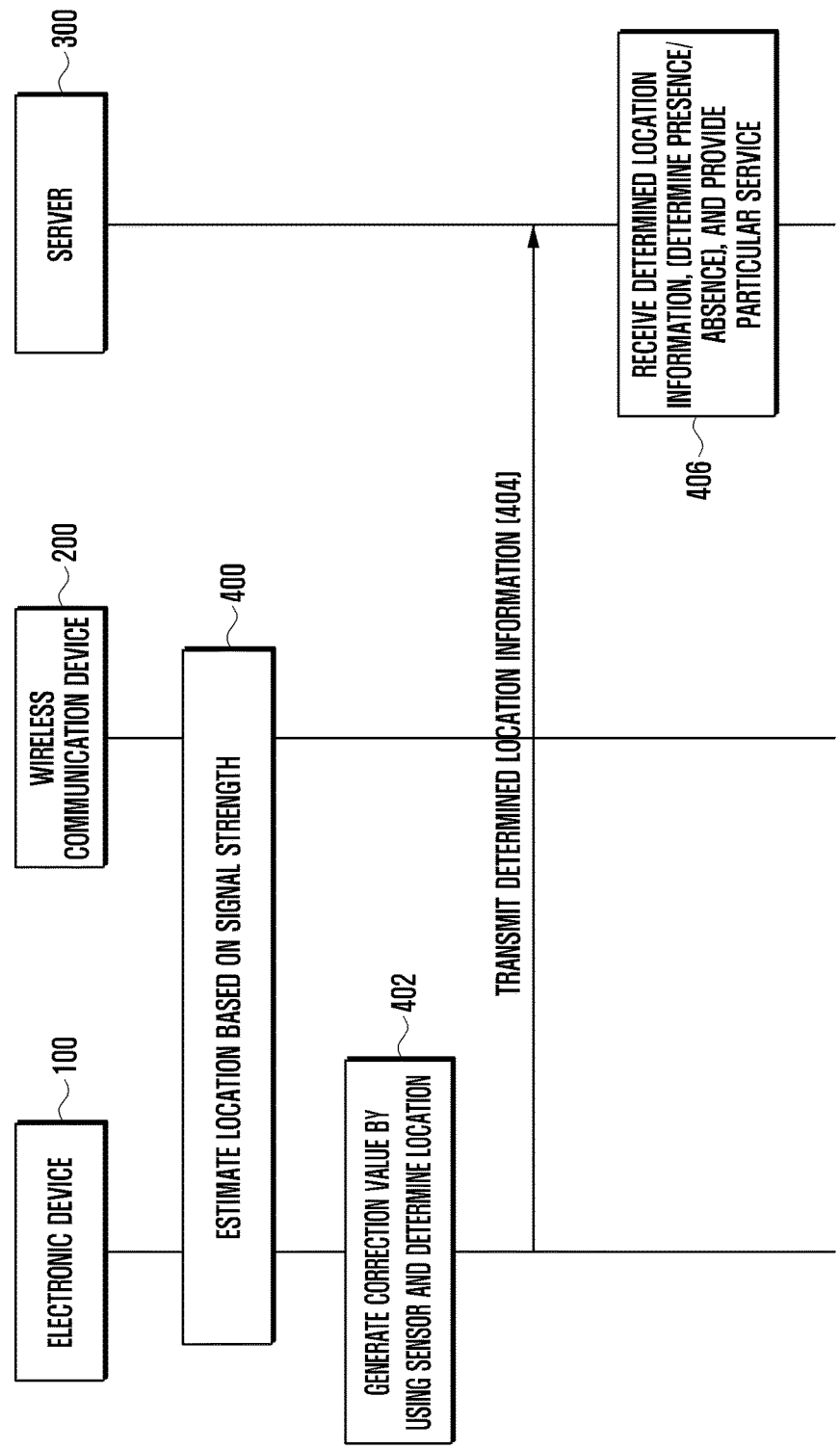

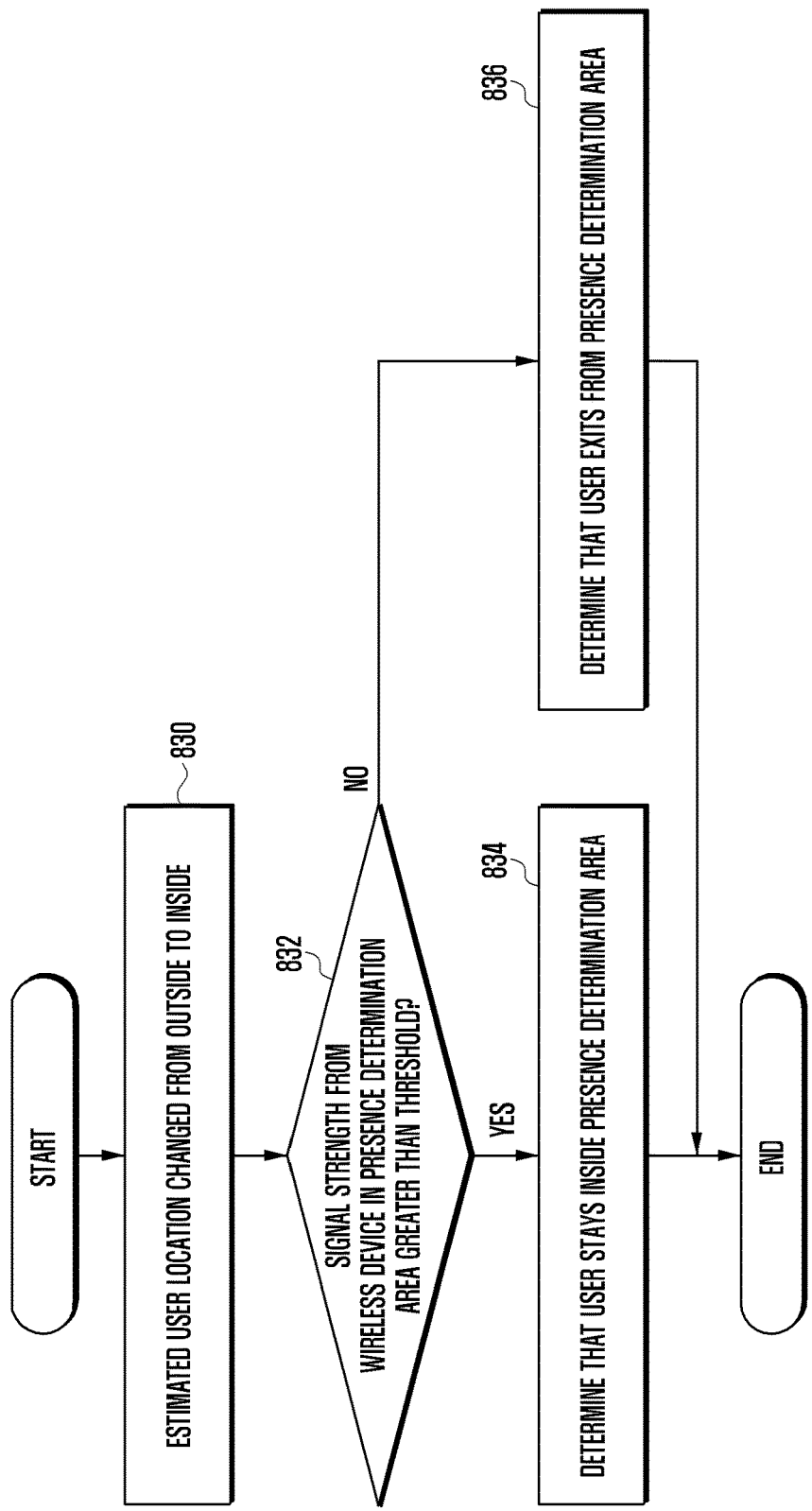

ELECTRONIC DEVICE, SERVER, AND METHOD FOR DETERMINING PRESENCE OR ABSENCE OF USER WITHIN SPECIFIC SPACE

CROSS-REFERENCE TO RELATED APPLICATION

This application is based on and claims priority under 35 U.S.C. § 119 to Korean Patent Application No. 10-2016-0157177 filed on Nov. 24, 2016 in the Korean Intellectual Property Office, the entire disclosure of which is incorporated by reference herein.

TECHNICAL FIELD

The present disclosure relates generally to an electronic device, server, and method for determining a user's presence or absence within a specific space and providing a subsequent particular service.

BACKGROUND

Generally, there are two kinds of methods for detecting the presence or absence of a person (hereinafter, also referred to as a user). One is to detect the presence or absence of a user who wears or carries no device, and the other is to detect the presence or absence of a user who wears or carries a certain device.

The presence/absence detection method for a user wearing or carrying no device (i.e., device-free user) may be based on various sensors installed at positions where the presence or absence will be determined. One alternative method is to recognize presence or absence based on transmitting a radio wave and measuring a reflected wave. Another alternative method is to utilize information about whether specific electronic devices installed in a certain space are operated.

Thus, such a detection method requires many sensors distributed for detection or additional equipment for transmitting and measuring waves. Unfortunately, this may cause an increase in cost.

Meanwhile, the presence/absence detection method for a user wearing or carrying a certain device may be implemented through various techniques. One technique is to detect a user's device using a sensing device such as a reader (e.g., an RF reader) to thereby recognize the user's entrance into or exit from a specific space. Another technique is to measure a user's approximate location through the user's electronic device, such as a mobile terminal or a wearable device, capable of wireless communication.

However, in this case, there is a problem of inaccuracy in detecting the user's location in a certain space. In addition, if any sensing device such as a reader is needed, an undesirable increases in cost cannot be avoided.

SUMMARY

Accordingly, the present disclosure provides various example methods and apparatuses for detecting, without requiring additional equipment, whether a user is located in a specific space.

In addition, the present disclosure provides example methods and apparatuses for detecting the presence or absence of a user in a specific space by using an electronic device which is carried or worn by the user and is also capable of wireless communication.

In addition, the present disclosure provides example methods and apparatuses for detecting the presence or absence of a user with increased accuracy through a user's electronic device capable of wireless communication.

In addition, the present disclosure provides example methods and apparatuses for offering, by using a result of detecting the presence or absence of a user in a specific place, a particular service corresponding to the place where the user is located.

According to one example embodiment of the present disclosure, a method for determining a presence or absence of an electronic device in a specific space at the electronic device may comprise estimating a current location based on strength of signals received from a plurality of wireless communication devices; firstly correcting the estimated location by using movement information acquired through a sensor; secondly correcting the firstly corrected location by using information about a boundary area of a predefined presence determination area; and determining the presence or absence in the presence determination area, based on the secondly corrected location.

According to another example embodiment of the present disclosure, an electronic device for determining a presence or absence thereof in a specific space may comprise a communication unit configured to communicate with a server and to measure strength of signals received from a plurality of wireless communication devices; a sensor unit configured to sense movement information of the electronic device; a memory configured to store presence determination area information, location history information, and current location information; and a controller configured to estimate a current location based on the signal strength measured by the communication unit, to firstly correct the estimated location by using the movement information acquired by the sensor unit, to secondly correct the firstly corrected location by using information about a boundary area of a predefined presence determination area stored in the memory, and to determine the presence or absence in the presence determination area, based on the secondly corrected location.

According to still another example embodiment of the present disclosure, a method for determining a presence or absence of an electronic device in a specific space at a server, based on location information received from the electronic device, may comprise receiving identifier information and current location information of the electronic device from the electronic device; correcting the location information by using information about a boundary area of a predefined presence determination area; and determining the presence or absence in the presence determination area, based on the corrected location information.

According to yet another example embodiment of the present disclosure, a server for determining a presence or absence of an electronic device in a specific space may comprise a communication unit configured to receive identifier information and current location information of the electronic device from the electronic device; a memory configured to store at least one of presence determination area information, boundary area information of the presence determination area information, location history information received from the electronic device, and current location information; and a controller configured to correct the current location information by using the boundary area information of the presence determination area information stored in the memory, and to determine the presence or absence in the presence determination area, based on the corrected current location information.

BRIEF DESCRIPTION OF THE DRAWINGS

The above and other aspects, features, and attendant advantages of certain example embodiments of the present disclosure will be more apparent and readily appreciated from the following detailed description, taken in conjunction with the accompanying drawings, in which like reference numerals refer to like elements.

FIG. 5A is a diagram illustrating signal flows among respective nodes for estimating and correcting the location of an electronic device and performing subsequent operations according to an example embodiment of the present disclosure.

FIGS. 9A to 9D are flow diagrams illustrating operations of determining presence or absence in a presence determination area according to various example embodiments of the present disclosure.

DETAILED DESCRIPTION

Figure 1:
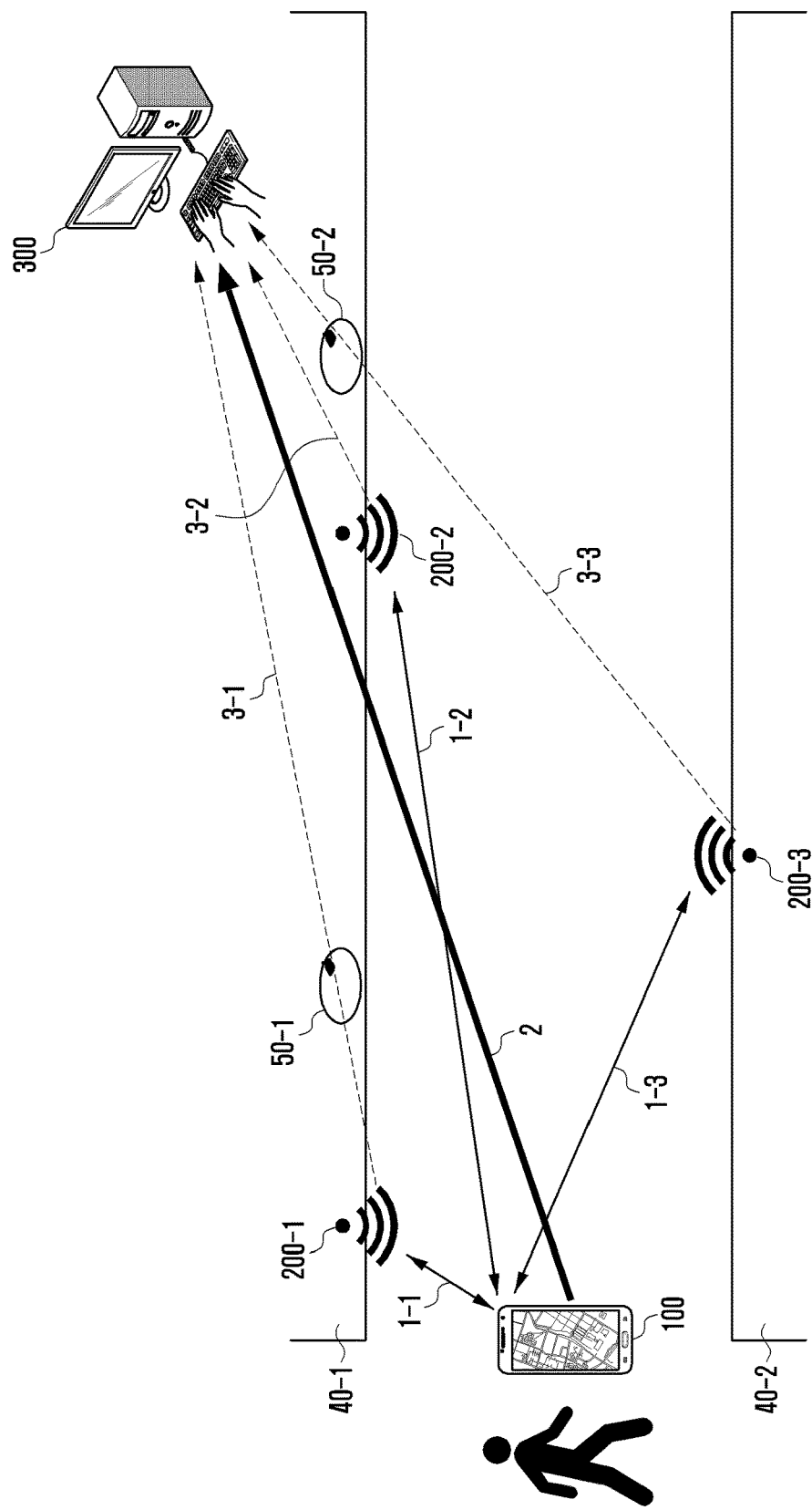
FIG. 1 is a conceptual diagram of an example system to which the present disclosure is applied.

Hereinafter, various example embodiments of the present disclosure will be described in detail with reference to the accompanying drawings. In describing the example embodiments, descriptions of techniques which are well known in the art to which the present disclosure belongs and which are not directly related to the present disclosure will not be described or illustrated in detail. This is to avoid obscuring the subject matter of the present disclosure. For the same reason, some elements are exaggerated, omitted or shown schematically in the accompanying drawings. Also, the size of each element may not entirely reflect the actual or relative size. In the drawings, the same or corresponding elements are denoted by the same reference numerals.

FIG. 1 is a conceptual diagram of an example system to which the present disclosure is applied.

Referring to FIG. 1, illustrated is a case in which a user moves in a specific space while carrying or wearing an electronic device 100 having portability or wearability and capable of wireless communication. Also, the example shown in FIG. 1 is a case in which the user moves along a hallway in a building or a road outside the building from left to right. In the following description, the electronic device 100 having portability or wearability and capable of wireless communication will be referred to as the electronic device. In addition, it is assumed for convenience of explanation that the user moves along a hallway in a building, rather a road outside the building. This is, however, by way of example only and should not to be construed as a limitation of the present disclosure.

As shown in FIG. 1, the user moves from left to right between (in the drawing) both walls 40-1 and 40-2 of the hallway. Wireless communication devices 200-1, 200-2 and 200-3 are installed at specific positions on the walls 40-1 and 40-2. Lighting devices 50-1 and 50-2 are installed on the wall or the ceiling. A server 300 is disposed in an area which is unrelated to the hallway along which the user carrying (or wearing) the electronic device 100 moves.

When the user carries the electronic device 100 and moves from left to right as shown in FIG. 1, the electronic device 100 may receive signals from the wireless communication devices 200-1, 200-2 and 200-3 adjacent thereto and estimate a relative location thereof. If each of the wireless communication devices 200-1, 200-2 and 200-3 is a node that performs wireless communication of Wi-Fi type, the relative location may be measured by estimating the strength of signals broadcasted from each of the wireless communication devices 200-1, 200-2 and 200-3. In another example, the wireless communication devices 200-1, 200-2 and 200-3 may be base stations in a cellular network. In still another example, the wireless communication devices 200-1, 200-2 and 200-3 may be, without limitation, short-range communication devices that emit Bluetooth, BLE, Zigbee, Z-wave, UWB, infrared, or ultrasound signals. Namely, the wireless communication devices 200-1, 200-2 and 200-3 to which the present disclosure is applied may be any type of the above wireless communication devices. Further, a variety of devices other than the above types may be used as long as the electronic device 100 can estimate its location by receiving signals from the wireless communication devices 200-1, 200-2 and 200-3. It will be assumed in the following description that the electronic device 100 can measure signals received from the wireless communication devices 200-1, 200-2 and 200-3 as indicated by reference numerals 1-1, 1-2 and 1-3 and/or can report the strength of the measured signals to the wireless communication devices 200-1, 200-2 and 200-3.

The electronic device 100 may estimate a relative location thereof by using the characteristics of signals received from the wireless communication devices 200-1, 200-2 and 200-3. When estimating the location of the electronic device 100 based on the strength of signals received from the wireless communication devices 200-1, 200-2 and 200-3, the exact physical coordinates of the wireless communication devices 200-1, 200-2 and 200-3 may be unknown or known. When the exact physical coordinates are unknown, the electronic device 100 may estimate how far it is from each of the wireless communication devices 200-1, 200-2 and 200-3, based on the signals received from the wireless communication devices 200-1, 200-2 and 200-3, namely, estimate a relative location. This estimation method may be performed by producing three circles on the basis of the strength of signals received from the wireless communication devices 200-1, 200-2 and 200-3 and then estimating the electronic device 100 to be located within the intersection of the circles. Besides the above-discussed method using the received signal strength indicator (RSSI) information, any other method using Cell-ID or using the angle or turnaround time of a received signal obtained through time of arrival (ToA), time difference of arrival (TDoA), angle of arrival (AoA), or round trip time (RTT) technique may be used for estimating the location.

Meanwhile, the electronic device 100 may have drawing or map information of the building, and also have location information of the wireless communication devices 200-1, 200-2 and 200-3. In this case, the electronic device 100 may estimate a relative location, based on the strength of signals received from the wireless communication devices 200-1, 200-2 and 200-3, and then correct the relative location by using the drawing or map information of the building. Namely, after estimating a rough location of the electronic device 100 on the basis of the strength of the received signals, the electronic device 100 may accurately determine the location thereof by excluding points at which the user's presence is disallowed from the rough location through the drawing or map information. Further, more accurate estimation is possible if the drawing or map information contains internal placement information. For example, if information regarding the layout of desks, the layout of partitions, the layout of glass walls, etc. is added, it may be easier to correct a user's movement path. In addition, if slope information about a stairway or ramps for disabled people is added, it may be more efficient to identify the movement path.

In this disclosure, it is assumed that the electronic device 100 includes various kinds of sensors therein. In case of using an acceleration sensor, an altitude sensor, an angular velocity sensor, and the like among the sensors of the electronic device 100, the estimated location may be corrected by applying information about a user's movement from an estimation time. Of course, the map or drawing information may also be used for correcting the estimated location. Therefore, it will be assumed that the electronic device 100 includes some sensors capable of acquiring user movement information. Hereinafter, a method for correcting the estimated location by using various sensors of the electronic device 100 will be described.

The strength and related values of Wi-Fi signals measured by the electronic device 100 may be stored in the following form. For example, the strength values of Wi-Fi signals may be stored in a terminal memory 105 of the electronic device 100, as shown in Table 1 below.

TABLE 1

| Timestamp | SSID | RSSI |
|---|---|---|
| 0384842834 | f4:d9:fb:95:91:00 | −60 |
| 1775736043 | f4:d9:fb:95:93:c0 | −58 |
| ... | ... | ... |

In Table 1, the timestamp represents a time point when the electronic device 100 measures the signal strength. Also, the SSID represents an identifier of a Wi-Fi device, i.e., a wireless communication device, and the RSSI represents the measured strength of a signal received from the corresponding Wi-Fi device.

In addition, information detected by the acceleration sensor equipped in the electronic device 100 may be stored in the terminal memory 105, as shown in Table 2 below.

TABLE 2

| Timestamp | X | Y | Z |
|---|---|---|---|
| 5503240253 | −0.830 | 3.484 | 6.402 |
| 5507659294 | −0.767 | 3.584 | 6.536 |
| ... | ... | ... | ... |

In Table 2, the timestamp represents a time point when the electronic device 100 detects information by using the acceleration sensor, and the values of X, Y and Z may be acceleration information corresponding to respective axes of the three-dimensional space.

Therefore, using the above example information shown in Tables 1 and 2, the electronic device 100 may correct the location information. Also, as described above, additional correction is possible if there is the map information.

When the estimated location information is transmitted to the server 300, the electronic device 100 may use a message having a form shown in Table 3 below.

TABLE 3

User_location
{
    "deviceid":""b827ebe235c3",
    "x":10.0,
    "y":12.0
}

In Table 3, the message clarifies that it is for informing the location information of the user, and is transmitted containing a device ID value which is the identifier information of the electronic device 100. Also, the message expresses latitude and longitude information or movement information by "x" and "y" values.

Since the electronic device 100 transmits the identifier information to the server 300, the server 300 may provide different services to respective electronic devices. For example, in a case of controlling a streetlight, this service may be applied to all electronic devices in common. Also, in a case of determining entrance into or exit from a workplace, this service may be applied to only employees who work in the workplace. Also, in a case of a system for detecting intrusions into a home, the alarm should not ring when members of household return home. Like such cases, services may be either provided to all electronic device users or to only a certain group, and the server 300 may selectively provide various types of services by using the identifier information of the electronic device 100.

As described above, the electronic device 100 that estimates and corrects its location may provide current location information to the server 300 as indicated by a reference numeral 2. Further, the location of the electronic device 100, namely, the location of the user, may be corrected again using a second correction method as will be described below. The second correction method may be performed at the electronic device 100 or at the server 300. The method for estimating and correcting the location of the electronic device 100 will be described below in detail.

The location of the electronic device 100 may be reported to the server 300 directly by the electronic device 100 as indicated by the reference numeral 2, or may not. For example, the server 300 may estimate and correct the location of the electronic device 100, based on signals received from the wireless communication devices 200-1, 200-2 and 200-3. Alternatively, at least one of the wireless communication devices 200-1, 200-2 and 200-3 may report the signal strength information between the electronic device 100 and the wireless communication devices to the server 300.

When the electronic device 100 directly provides the location information thereof to the server 300 as indicated by the reference numeral 2, the wireless communication devices 200-1, 200-2 and 200-3 may not need to specially provide information to the server 300. On the other hand, if the electronic device 100 does not provide the location information thereof to the server 300, the server 300 should receive, from all or at least one of the wireless communication devices 200-1, 200-2 and 200-3, the result of the electronic device 100 measuring the strength of signals with the communication devices 200-1, 200-2 and 200-3, and then acquire the location information of the electronic device 100, based on the received result. In this case, the electronic device 100 that measures the strength of signals received from the wireless communication devices 200-1, 200-2 and 200-3 should transmit the measured strength information to at least one of the wireless communication devices. In an example shown in FIG. 1, the electronic device 100 offers the strength information of a signal received from each of the wireless communication devices 200-1, 200-2 and 200-3 to each of the wireless communication devices 200-1, 200-2 and 200-3. The wireless communication devices 200-1, 200-2 and 200-3 that receive the signal strength information from the electronic device 100 may transmit the received information to the server 300.

At this time, the electronic device 100 may additionally transmit information obtained from the sensor to the server 300 directly or through at least one of the wireless communication devices.

The details of measuring the signal strength together with the wireless communication devices are as follows. The electronic device 100 may measure the strength information of a signal received from the first wireless communication device 200-1 and then provide the measured information to the first wireless communication device 200-1 as indicated by a reference numeral 1-1. Similarly, the electronic device 100 may measure the strength information of a signal received from the second wireless communication device 200-2 and then provide the measured information to the second wireless communication device 200-2 as indicated by a reference numeral 1-2. Similarly, the electronic device 100 may measure the strength information of a signal received from the third wireless communication device 200-3 and then provide the measured information to the third wireless communication device 200-3 as indicated by a reference numeral 1-3. Thus, the first wireless communication device 200-1 may transmit the signal strength information, received from the electronic device 100, to the server 300 as indicated by a reference numeral 3-1. Also, the second wireless communication device 200-2 may transmit the signal strength information, received from the electronic device 100, to the server 300 as indicated by a reference numeral 3-2, and the third wireless communication device 200-3 may provide the signal strength information, received from the electronic device 100, to the server 300 as indicated by a reference numeral 3-3. In addition, the electronic device 100 may further transmit sensor information to at least one wireless communication device. In some embodiments, the identifier information of each of the wireless communication devices 200-1, 200-2 and 200-3 and the electronic device 100 may be, without limitation, a MAC address, a telephone number, or the like. Any other type of information for identifying such devices is possible. Although the MAC address or the telephone number is used as an example for understanding the present disclosure, the present disclosure is not limited thereto.

The server 300 may store, together with the electronic device 100 or alone, the internal structure information (or map information) of the building and the location information of each wireless communication device. Therefore, the server 300 may estimate the relative location of the electronic device 100 by using the received signal strength information and the sensor information of the electronic device 100, and then correct the estimated location by using the internal structure information (or map information) of the building. Besides using RSSI for location estimation, the server 300 may use Cell-ID or use the angle or turnaround time of a received signal obtained through a ToA, TDoA, AoA, or RTT technique.

Meanwhile, the server 300 may be a particular server that performs specific control in the building. For example, this server may perform various types of control such as indoor lighting, air conditioning, fire detection, and user's position detection in case of fire. The control operations of the server 300 will be described later in detail. Herein, it is assumed that the indoor lighting is controlled. In FIG. 1, connection lines between the server 300 and the lighting devices 50-1 and 50-2 are not illustrated to avoid complicating the drawing.

In FIG. 1, the plurality of lighting devices 50-1 and 50-2 are installed on a path of hallway along which the user moves. The lighting devices 50-1 and 50-2 may be turned on or off under the control of the server 300. In view of the above-discussed two schemes, the details will be described hereinafter.

First, if the server 300 receives the estimated and corrected location information from the electronic device 100, the server 300 may control the plurality of lighting devices 50-1 and 502 based on the received location information. Namely, the server 300 may determine whether the user's electronic device 100 is present in or absent from a specific area, and thereby control the lighting devices 50-1 and 50-2. Herein, the specific area may be the presence determination to be described below in detail. As an example of controlling the plurality of lighting devices 50-1 and 50-2, the server 300 may turn off some lighting devices on the path that the user has passed, and turn on some lighting devices for brighten the user's view.

Second, the electronic device 100 may measure the strength of signals received from the wireless communication devices 200-1, 200-2 and 200-3, and then report the measured result to the corresponding wireless communication devices 200-1, 200-2 and 200-3 or to one particular wireless communication device, e.g., the nearest first wireless communication device 200-1. At this time, the electronic device 100 may also report the identifier information thereof and the information obtained from the sensor to the first wireless communication device 200-1. Then, each of the wireless communication devices 200-1, 200-2 and 200-3 or only the first wireless communication device 200-1 may report the signal strength information and the sensor information, received from the electronic device 100, to the server 300. Thus, the server 300 may estimate the location of the electronic device 100, based on the signal strength information and the sensor information received from each of the wireless communication devices 200-1, 200-2 and 200-3 or only the first wireless communication device 200-1. In addition, the server 300 may correct the estimated location of the electronic device 100 by using the structure information (or drawing) of the building. In the end, the location of the electronic device 100, namely, the location of the user, may be estimated. Thereafter, the server 300 may turn off some lighting devices on the path that the user has passed, and turn on some lighting devices to brighten the user's view.

In the example of FIG. 1 described above, the server 300 has an integrated form in which there are a server for providing a suitable service and a server for determining the presence or absence of the user in the presence determination area. However, such servers may be separately implemented as will be readily apparent to those skilled in the art. In this disclosure, for convenience of description, the server 300 is assumed to be a single integrated server.

In this disclosure, the presence determination area may have various types. For example, a physically separated space such as, without limitation, a meeting room, a staff lounge, a private office, a hotel room, or a classroom may be defined as the presence determination area. Also, each of spaces into which a wide office is divided by partitions may be defined as the presence determination area. Also, a space that is not physically separated may be divided into a plurality of presence determination areas. For example, in a hallway, a road, or the like, a specific section unit may be defined as the presence determination area. In this case, the center of the specific section unit may correspond to an object such as an electric lamp or a street lamp that needs the automatic control. In addition, even in case of requiring no automatic control, the presence determination area may be defined. For example, when a fire occurs in a building, or when an intrusion detection system detects an intrusion, the presence determination area may be defined to more accurately estimate the user's location. In addition, different presence determination areas may be overlapped with each other. The electronic device may obtain information about the presence determination area and the boundary area of the presence determination area from a certain server manually by the user or automatically when entering a specific region. In this case, the server may be identical with or different from the server shown in FIG. 1. Also, the electronic device may manually or automatically receive and store the internal configuration information of the building, such as partition information and room information, in addition to the map information. The above-mentioned boundary area may correspond to a thickness (or width) for distinguishing between the inside and the outside of the presence determination area to be described below. The boundary area will be also discussed below in detail.

Although the above description is based on lighting devices, any other embodiment is possible as will be described below.

Now, main elements of each device used in example implementations of the present disclosure will be described with reference to the accompanying drawings.

Figure 2:
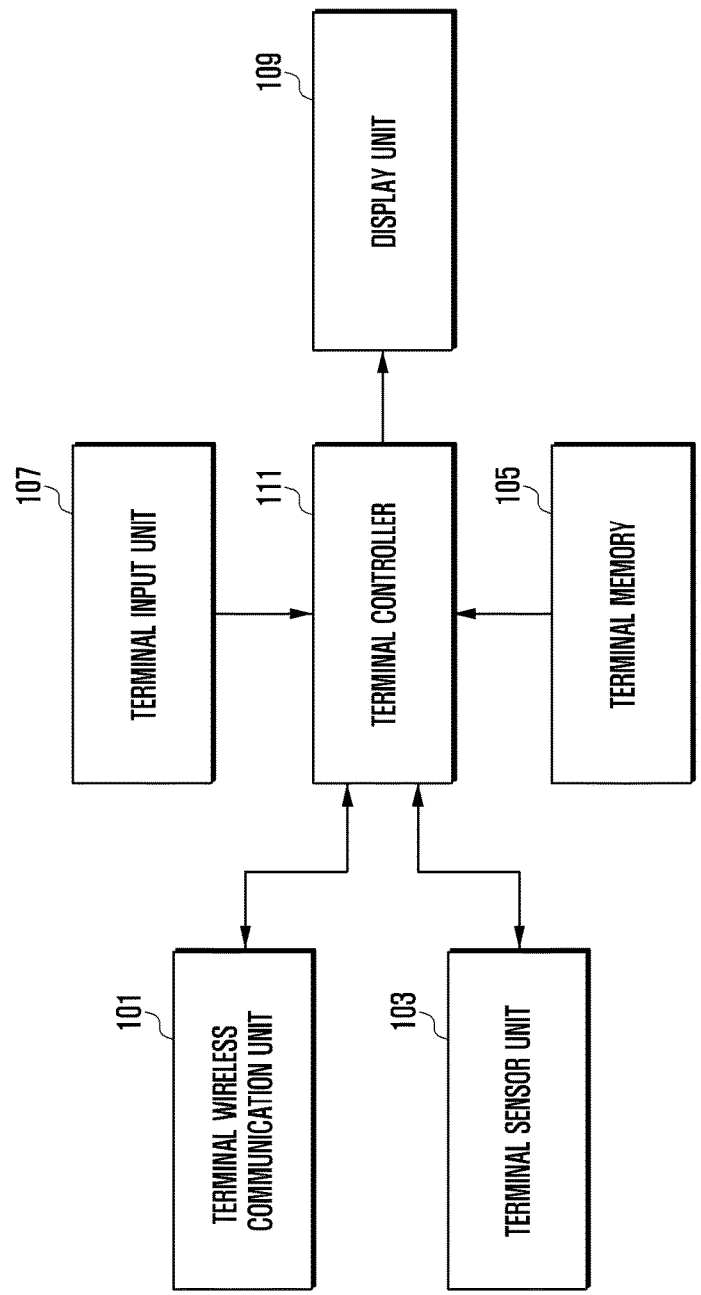
FIG. 2 is a functional block diagram of an electronic device according to an example embodiment of the present disclosure.

FIG. 2 is a functional block diagram of an electronic device according to an example embodiment of the present disclosure.

The illustrative electronic device (100 in FIG. 1, also referred to as a user terminal) shown in FIG. 2 can be carried or worn and is capable of wireless communication. By way of example and without limitation, the electronic device may be a tablet computer, a smart phone, a smart watch, a band, a ring, a necklace, augmented reality (AR) glasses, a head mounted display (HMD), or any other type device that a user can wear or carry. In addition, the electronic device shown in FIG. 2 may be mounted to a vehicle such as, without limitation, an automobile or a bicycle, an artificial intelligent robot, a drone, and the like. Hereinafter, for convenience of explanation, it is assumed that the electronic device has a portable or wearable form for the user.

The electronic device may include a terminal wireless communication unit 101, a terminal sensor unit 103, a terminal memory 105, a terminal input unit 107, a display unit 109, and a terminal controller 111.

The terminal wireless communication unit 101 may include wireless communication circuitry for transmitting and receiving data and/or signals to and from various kinds of wireless communication entities including, without limitation, a cellular network. The terminal wireless communication unit 101 may support various communication techniques such as, without limitation, cellular wireless communication, Wi-Fi, Bluetooth, BLE, Zigbee, Z-wave, UWB, GPS, infrared communication, and ultrasound communication.

For example, in case of transmitting and receiving data and control signals through a cellular network, the terminal wireless communication unit 101 may, for example, be configured with circuitry to encode and modulate baseband signals for transmission of data or signals in accordance with the cellular communication scheme, and to up-convert the encoded and modulated signals. Also, the terminal wireless communication unit 101 may, for example, be configured with circuitry to down-convert radio signals into baseband signals for reception of data or signals in accordance with the cellular communication scheme, and to demodulate and decode the baseband signals.

On the other hand, in case of supporting the Wi-Fi scheme, the terminal wireless communication unit 101 may be configured, for example, with circuitry to perform the above-described operations in accordance with the Wi-Fi scheme. In this way, the terminal wireless communication unit 101 may support one or more of the above-listed wireless communication schemes.

The terminal wireless communication unit 101 may perform the transmission and reception of signals through each wireless network, measure the strength of a signal received from a specific node of the wireless network, and provide a measured result to the terminal controller 111. A technique of measuring the received signal strength is well known in the art, so a detailed description thereof will be omitted. The terminal wireless communication unit 101 may be controlled to be suitable for providing a wireless communication service desired by the user under the control of the terminal controller 111. In addition, the terminal wireless communication unit 101 may provide information about the strength of a signal received from a specific node of the wireless network to that node or a plurality of nodes.

The terminal sensor unit 103 may include various kinds of sensors, such as, without limitation, a gyroscope, an acceleration sensor, an air pressure sensor, and an inertial sensor, to be used for location correction of the electronic device. In addition, the terminal sensor unit 103 may further include various sensors for the convenience of the user. The terminal sensor unit 103 may provide a user's movement information to the terminal controller 111. The movement information may be information sensed by the terminal sensor unit 103 while the user carrying or wearing the electronic device is moving. In addition, the terminal sensor unit 103 may provide the terminal controller 111 with various sensing information such as biometric information (e.g., fingerprint recognition) or touch information sensed by sensors equipped for user's convenience.

The terminal memory 105 has a region(s) for storing various kinds of control information required by the electronic device and a region(s) for temporarily storing data generated during the control of the electronic device. According to an example embodiment, the terminal memory 105 may store a control program and data for estimating and correcting the location information of the electronic device. According to another example embodiment, the terminal memory 105 may store a control program and data for estimating the location information of the electronic device and providing the estimated location information to the server. In addition, the terminal memory 105 may further have a region(s) for storing the finally corrected location information obtained through first and second corrections of the estimated location information. The finally corrected location information may be stored as many required numbers and also stored in a stack form. For example, if a memory region for storing history information is configured to store five pieces of history information, this memory region may have been already filled with five pieces of history information before the current location information is stored. In this case, in order to newly store the current location information, the oldest history information may be deleted. The number of pieces of history information may vary depending on the memory capacity and a required amount of history information. The history information may include the estimated and/or corrected location information of the electronic device and the estimated and/or corrected time information. If necessary, basis data for estimating and/or correcting the location data may be stored together. For example, if various sensors of the electronic device such as a gyroscope, an acceleration sensor, and an atmospheric pressure meter are used for the estimation of location, information obtained from these sensors may be stored together.

In addition, the terminal memory 105 may further include a region(s) for storing, without limitation, presence determination area information, map information, layout information, and the like of a specific building or space. For example, if any presence determination area has a quadrangle shape, the presence determination area information may be composed of eight pieces of coordinate information in consideration of thickness information of the presence determination area. This example is shown in FIG. 7D. Each of reference numerals 671, 672, 673, 674, 675, 676, 677 and 678 indicates the coordinates of a single point. These coordinates are shown in Table 4 below.

TABLE 4

| Reference numeral | x coordinates | Y coordinates |
|---|---|---|
| 671 | 0 | 0 |
| 672 | 60 | 0 |
| 673 | 10 | 10 |
| 674 | 50 | 10 |
| 675 | 10 | 70 |
| 676 | 50 | 70 |
| 677 | 0 | 80 |
| 678 | 60 | 80 |

In Table 4, the x and y coordinates may be relative location values rather than actual (or absolute) location values. In particular, the presence determination area may include a boundary area having a certain thickness (or width), and thus thickness information of the boundary area may be further required to determine whether the user is carrying the electronic device in the presence determination area. Considering the thickness information of the boundary area, reference numerals 673, 674, 675 and 676 indicate four inside vertexes (or vertices) of the presence determination area, and reference numerals 671, 672, 677 and 678 indicate four outside vertexes. The coordinates of these vertexes may be stored in the form of a single table as shown in Table 4, or may be added to map data in the form of latitude and longitude. In addition, as described above, in case of setting the presence determination area within a building, a plurality of presence determination areas may be defined on one floor. Also, as described above, the presence determination area may be defined to correspond to the respective lighting devices in the hallway, or defined as a single room such as a meeting room, a hotel room, or a classroom. Also, one presence determination area may or may not be overlapped with another presence determination area. For example, in case of controlling the lighting devices in the hallway, the presence determination areas corresponding to the respective lighting devices may be overlapped with each other for illumination control. Further, one or more presence determination areas may be defined in a single wide space. For example, an office having a large space may require a first presence determination area used for simply detecting whether there is a certain user in the office. Also, this office may further require second presence determination areas, each of which is used for detecting whether the user is present or not in a corresponding partition. The second presence determination areas may or may not be overlapped.

In addition, the terminal memory 105 may further have a region(s) for storing various kinds of information associated with a user's need or convenience. The terminal memory 105 may have various forms such as, without limitation, a volatile memory, a nonvolatile memory, an embedded memory, an external memory, and the like. However, the terminal memory 105 is not limited to a particular form or type.

The terminal input unit 107 is one of the interfaces between the user and the electronic device and receives a user's input. The terminal input unit 107 may include devices, components and/or circuitry for receiving various types of input such as a touch input, a pen input, a touch and drag input, a hovering input, a key input, a voice input, and a gesture input. The terminal input unit 107 may detect a user's input and provides a signal based on the detected input to the terminal controller 111.

The display unit 109 may provide a graphical user interface (GUI) for indicating a current state of the electronic device and providing an interface with the user under the control of the terminal controller 111. The display unit 109 may include, without limitation, a liquid crystal display (LCD), an organic light emitting diode (OLED), an active matrix OLED (AMOLED), a flexible display, a hologram, or the like. The display unit 109 is not limited to a particular form or type. The display unit 109 may change a display on the screen in a specific case. For example, if there is predetermined information corresponding to the presence determination area, and if the user is detected within the presence determination area, the display unit 109 may display the predetermined information on the screen under the control of the controller 111. Also, the terminal controller 111 may perform a specific controlling operation in response to a user's touch input or any other input while the display unit 109 performs a displaying operation. In a certain case, the terminal controller 111 may perform an operation for controlling an external electronic device.

In addition, the terminal input unit 107 and the display unit 109 may be integrated into a single module, for example, a touch screen display as will be apparent to those skilled in the art.

The terminal controller 111 controls the overall control of the electronic device, and in particular, may control the operation of estimating the location of the electronic device and correcting the estimated location. In addition, the terminal controller 111 may control the display unit 109 to change a display on the screen in a specific case. For example, if there is any information predetermined for a specific location (e.g., information necessary for a game, information to be displayed in an athletic facility, information to be displayed in a school), or if a request for a display change is received from a server, the terminal controller 111 may control the display unit 109 to display corresponding information, based on whether the electronic device is in the presence determination area.

The terminal controller 111 may be formed of an application processor or other processor or processing circuitry (e.g., a CPU). The operations of the terminal controller 111 such as the estimation of a device location, the correction of the estimated location, and the transmission of information for such estimation and correction will be described below in detail.

The above-described electronic device can be carried or worn by the user. However, the electronic device of the present disclosure is not limited thereto. Alternatively, as mentioned above, the electronic device may be applied to an artificial intelligent robot, a drone, a recognition card for identifying the user in the workplace, and the like, which may include only some of the above-discussed elements as will be apparent to those skilled in the art.

Figure 3:
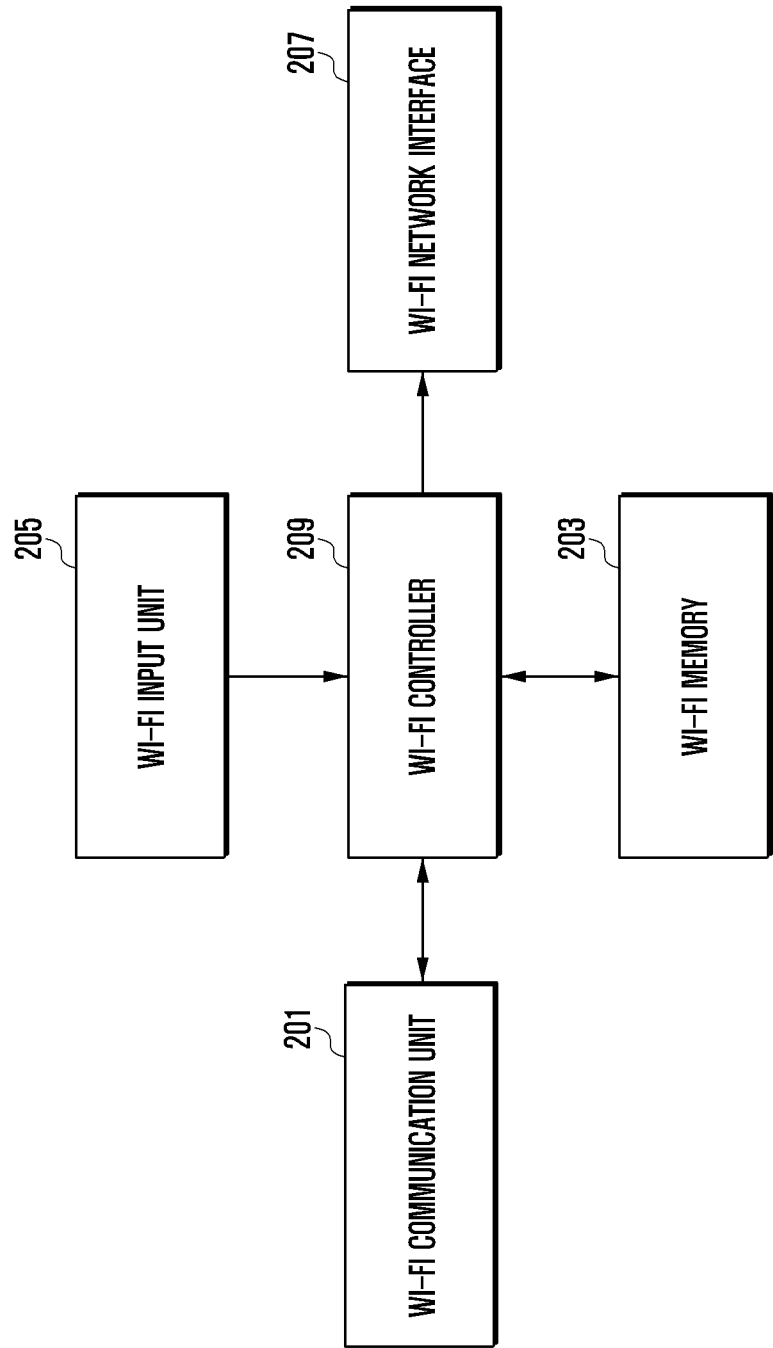
FIG. 3 is a block diagram of a Wi-Fi device according to an example embodiment of the present disclosure.

FIG. 3 is a block diagram of a Wi-Fi device according to an example embodiment of the present disclosure.

The Wi-Fi device shown in FIG. 3 is an example of a node corresponding to the wireless communication device 200-1, 200-2 or 200-3 in FIG. 1. As described above, the wireless communication device may have various types, and the Wi-Fi device is merely one type. The Wi-Fi device may be a wireless access point or a wired/wireless router.

The Wi-Fi device may include a Wi-Fi communication unit 201, a Wi-Fi memory 203, a Wi-Fi input unit 205, a Wi-Fi network interface 207, and a Wi-Fi controller 209.

The Wi-Fi communication unit 201 may include wireless communication circuitry for encoding and modulating baseband signals for transmission of data or signals in accordance with the Wi-Fi scheme, and to up-convert the encoded and modulated signals. Also, the Wi-Fi communication unit 201 may be configured with circuitry to down-convert radio signals into baseband signals for reception of data or signals in accordance with the Wi-Fi scheme, and to demodulate and decode the baseband signals. The Wi-Fi communication unit 201 may receive the received signal strength information of each node and the sensing information from the electronic device 100 and then provide the received information to the Wi-Fi controller 209.

The Wi-Fi memory 203 has a region(s) for storing various kinds of control information required by the Wi-Fi device and a region(s) for temporarily storing data generated during the control of the Wi-Fi device. In addition, the Wi-Fi memory 203 may store control data required for performing operations according to the present disclosure.

The Wi-Fi input unit 205 is configured with devices, components and/or circuitry for allowing a user or operator to input data to the Wi-Fi device or to reset the Wi-Fi device. The Wi-Fi input unit 205 may include an interface with any other device. For example, in order to allow the user or operator to enter information to the Wi-Fi device through an input unit of any external device such as a notebook computer, a desktop PC, or a server computer, the Wi-Fi input unit 205 may include a suitable configuration for interfacing with such an external device. When receiving an input from the external device or the user, the Wi-Fi input unit 205 provides the received input to the Wi-Fi controller 209.

The Wi-Fi network interface 207 is an interface including, for example, circuitry, for connecting the Wi-Fi device to various networks such as a private network, a public network, or the Internet. Therefore, the Wi-Fi network interface 207 has an interfacing configuration for enabling the Wi-Fi device to transmit or receive data to or from any other device existing in the network. Since the configuration of the Wi-Fi network interface 207 is well known in the art, further explanation is omitted.

The Wi-Fi controller 209 includes, for example a processor, circuitry and the like, for controlling the overall operation of the Wi-Fi device. For example, the Wi-Fi controller 209 may perform a control operation of detecting a certain electronic device that enters the coverage thereof, a control operation of registering a newly entering electronic device, and a control operation of performing communication desired by a new electronic device. In addition, when a specific signal, e.g., information for location estimation and correction according to the present disclosure, is received, the Wi-Fi controller 209 may control the received information to be provided to the server 300. A detailed description will be made below with reference to the following drawings.

Figure 4:
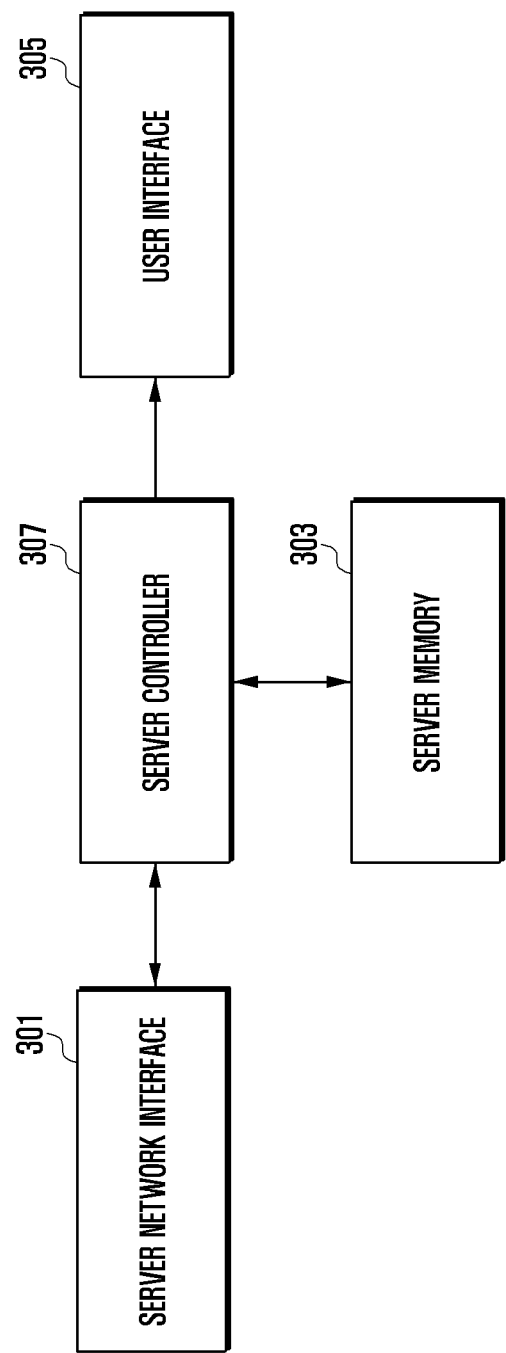
FIG. 4 is a block diagram of a server according to an example embodiment of the present disclosure.

FIG. 4 is a block diagram of a server according to an example embodiment of the present disclosure.

The server (e.g., 300 in FIG. 1) may include a server network interface 301, a server memory 303, a user interface 305, and a server controller 307.

The server network interface 301 is an interface, including, for example, circuitry, for connecting the server to the wireless communication device or various networks such as a private network, a public network, or the Internet. Therefore, the server network interface 301 has an interfacing configuration for enabling the server to transmit or receive data to or from any other device existing in the network. Since the configuration of the server network interface 301 is well known in the art, further explanation is omitted.

The server memory 303 has a region(s) for storing various kinds of control information required by the server and a region(s) for temporarily storing data generated during the operation or control of the server. In addition, the server memory 303 may store a control program or data required for performing operations of estimating the location of the electronic device and correcting the estimated location according to the present disclosure.

In addition, the server memory 303 may further have a region(s) for storing the finally corrected location information obtained through first and second corrections of the estimated location information. The finally corrected location information may be stored as many required numbers and also stored in a stack form. For example, if a memory region for storing history information is configured to store five pieces of history information, this memory region may have been already filled with five pieces of history information before the current location information is stored. In this case, in order to newly store the current location information, the oldest history information may be deleted. This number of stored pieces of history information may vary depending on the memory capacity and a required amount of history information.

In addition, the server memory 303 may further include a region(s) for storing, without limitation, presence determination area information, map information, layout information, and the like of a specific building or space. As described above and also shown in Table 4, the presence determination area information may, for example, be composed of eight pieces of coordinate information in consideration of thickness information of the presence determination area.

In addition, the server memory 303 may further store control data for selectively providing particular services depending on user's presence or absence in association with a specific presence determination area. For example, in a case of an office building, the server memory 303 may store control data to be applied, without limitation, for the detection of an intrusion of a user carrying or wearing the electronic device, the detection of an emergency victim, the automatic control of room lighting or air conditioning, and the like. Also, in case of a home, the server memory 303 may store control data to be applied, without limitation, for the in-home infant/child safety monitoring, the home appliance security lock function, and the like.

Additionally, in case of a hotel, the server memory 303 may store control data to be applied, without limitation, for the automatic control of room lighting or air conditioning, a room cleaning service of an empty room, a hotel facility use guide, and the like. Further, in case of a school, the server memory 303 may store control data to be applied, without limitation, for the device control of a classroom, an automatic attendance check, the creation of an academic atmosphere, and the like. Further, in case of a retail mall, the server memory 303 may store control data to be applied, without limitation, for the distribution of a discount coupon, the provision of a product advertisement, and the like.

Additionally, in case of an athletic facility, the server memory 303 may store control data to be applied, without limitation, for providing a customized game guide service. Further, in case of a factory, the server memory 303 may store control data to be applied, without limitation, for automatically executing an announcement about danger equipment access warning. Further, in case of a bus stop, the server memory 303 may store control data to be applied, without limitation, for guiding bus operation information. Further, in case of a staff lounge, the server memory 303 may store control data to be applied, without limitation, for executing an AR game. Further, in case of a hospital, the server memory 303 may store control data to be applied, without limitation, for providing a waiting sequence guide to outpatients.

Figure 13A:
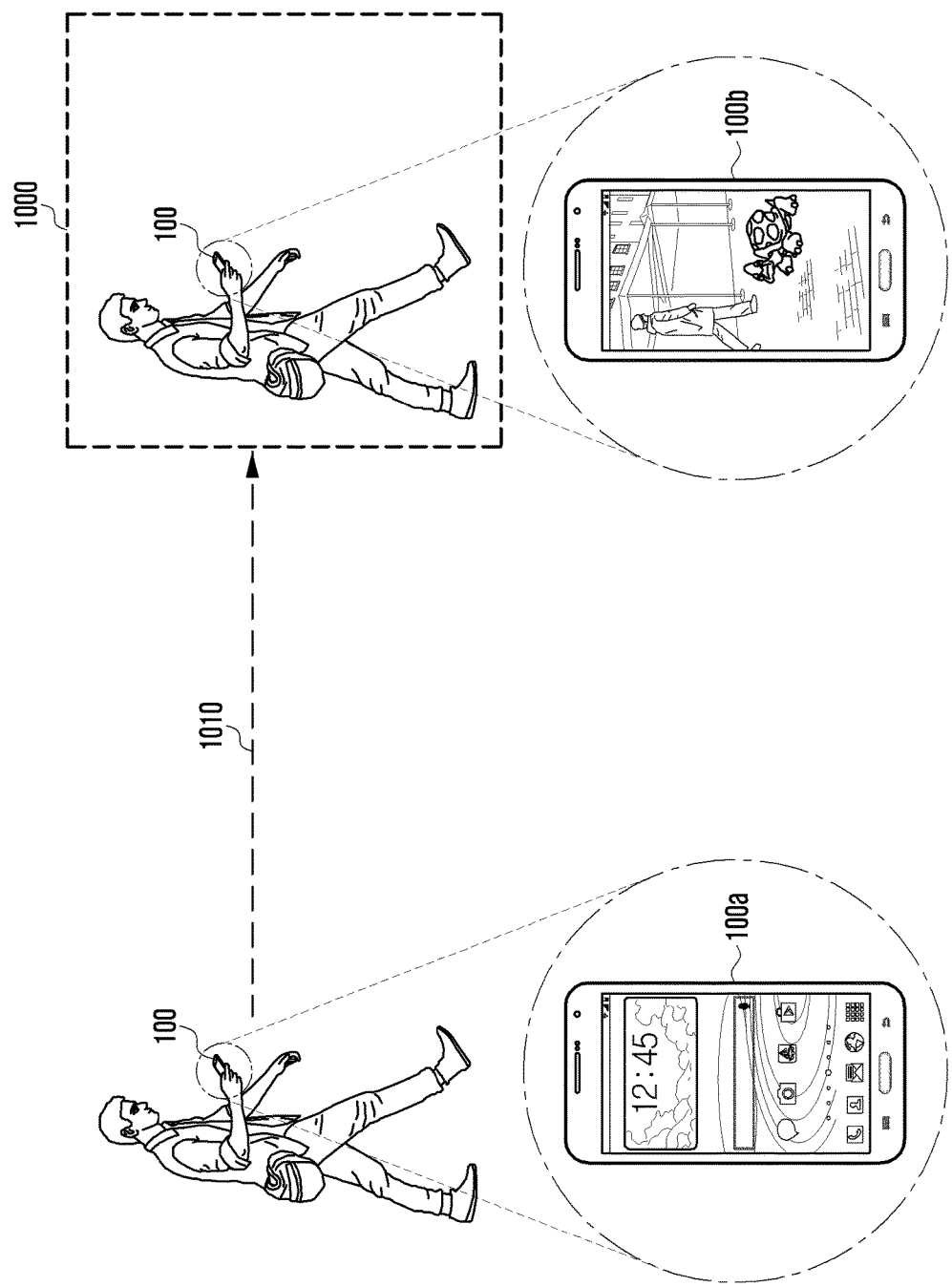
FIGS. 13A and 13B are diagrams illustrating a case of providing an AR game service and a case of providing an electric vehicle charging service according to example embodiments of the present disclosure.
Figure 13B:
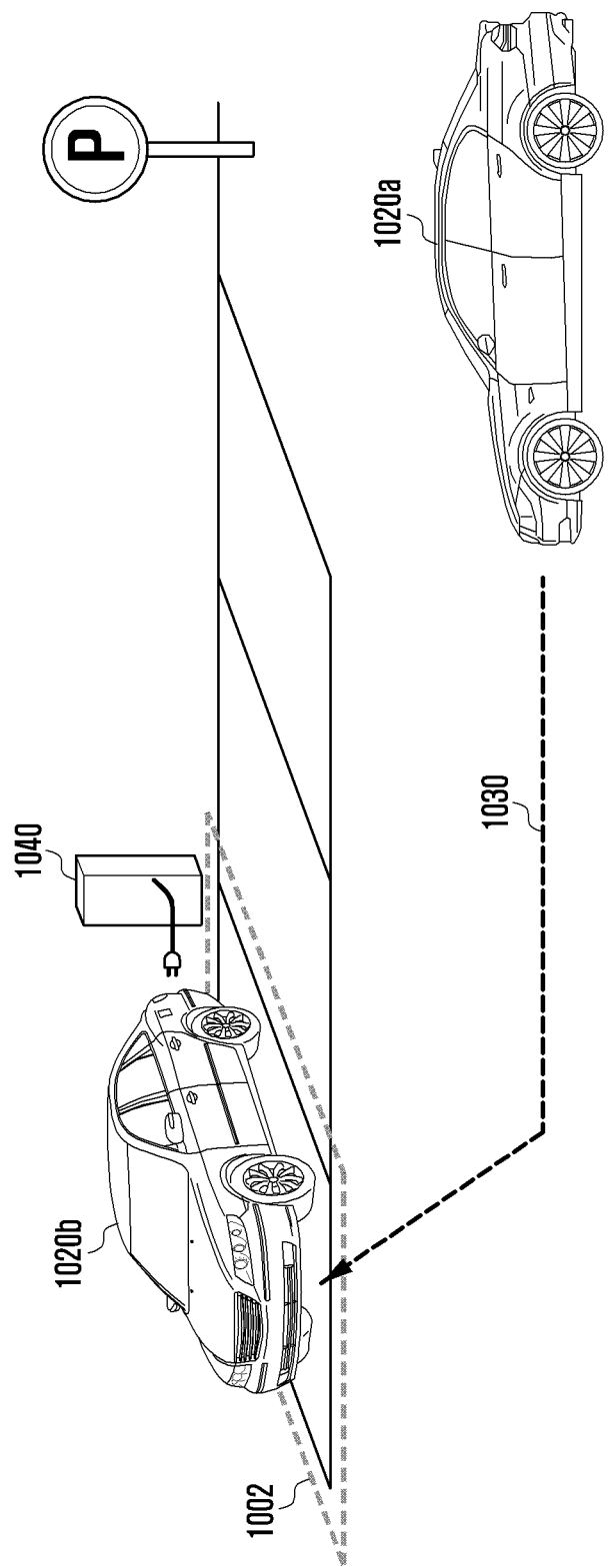

Now, examples of providing an AR game service and an electric vehicle charging service will be described. FIGS. 13A and 13B are diagrams illustrating a case of providing an AR game service and a case of providing an electric vehicle charging service according to non-limiting example embodiments of the present disclosure.

Referring to FIG. 13A, it is assumed that the user carrying the electronic device 100 is moving. Initially, the display unit 109 of the electronic device 100 may display an idle screen or a certain screen of a game desired by the user. For example, a reference numeral 100a indicates an idle screen displayed on the electronic device 100.

Thereafter, if the user who is moving rightwards as indicated by an arrow 1010 enters a presence determination area 1000, the electronic device 100 or the server 300 may detect the entrance into the presence determination area 1000. Then, the electronic device 100 located within the presence determination area 1000 may provide a predetermined game screen as indicated by a reference numeral 100b. According to this example embodiment shown in FIG. 13A, it is possible to provide a safe game environment by executing an AR game or displaying a game screen only within the presence determination area 1000. Namely, by allowing the execution of a game only within the presence determination area and disallowing it in a dangerous area (e.g., a roadside, a falling rock area, a construction site), it is possible to prevent an accident during the game.

In another embodiment, a highly-realistic AR service may be provided according to the spatial characteristics of the presence determination area. For example, if the presence determination area is a classroom, a highly-realistic game environment may be provided through virtual AR game avatars such as students and teachers suitable for a classroom environment. In this case, such avatars may be previously stored in the electronic device 100 or received from the server 300 and then displayed on the display unit 109 of the electronic device 100. In addition to the display unit 109 equipped in the electronic device 100, any external display device may be further used. For example, any well-known display device such as a beam projector, a TV, or a hologram device may be connected to and interwork with the electronic device 100 such as a tablet computer or a smart phone. In still another embodiment, a highly-realistic AR service may utilize sensing information of various Internet of Things (IoT) devices that exist in the presence determination. For example, if the IoT device is a temperature sensor, the shape and feature of an AR object such as a game avatar may vary according to changes of temperature in the presence determination area, thereby providing a highly-realistic AR service adapted to environmental variations.

In addition, when there is a user input in a state in which specific information is displayed on the electronic device, for example, when an input for instructing an action of an avatar or changing a costume of the avatar is received while the avatar is displayed, the electronic device may perform a particular operation in response to the user input. Similarly, the electronic device may receive various user inputs while various kinds of objects are displayed, and then may perform corresponding operations in response to the user inputs.

According to another example embodiment, when the user enters a certain store which is defined as the presence determination area in an offline shopping mall, the electronic device may search for and offer AR information about merchandise through merchandise DB information of the store.

According to yet another example embodiment, if the presence determination area is a popular tourist spot, the electronic device may determine a user's entrance into the presence determination area and then provide a service that guides the user to a good place to take photos.

According to still another example embodiment, the electronic device may determine that the user is in the presence determination area, and then provide a service for realizing a past appearance of the current space with AR.

Meanwhile, FIG. 13B shows an example of a case in which a specific area of a parking lot is defined as a presence determination area. Referring to FIG. 13B, an electric vehicle 1020*a* has an electronic device 100 according to the present disclosure and moves as indicated by a reference numeral 1030. A battery charging area 1002 is defined as the presence determination area. When the electric vehicle 1020*a* is located in the battery charging area 1002, a charging device 1040 may detect it and then automatically charge the electric vehicle 1020*a* located in the presence determination area as indicated by a reference numeral 1020*b*.

Additionally, in case of an exhibition hall or museum, a certain position corresponding to each exhibition work may be defined as a presence determination area so as to provide an automatic guide service about the exhibition work. Further, the presence determination area may be applied to various cases such as a surveillance camera for monitoring illegal parking, an electric vehicle charging service, and an automatic parking fee billing/guidance service.

Returning to FIG. 4, the server memory 303 may store, in a database, mapping relations between the above-discussed various control data and the presence determination areas. The server memory 303 may have various forms such as, without limitation, a volatile memory, a nonvolatile memory, an embedded memory, an external memory, and the like. The server memory 303 is not limited to a particular form or type.

The user interface 305 may be configured to provide an interface between the user and the server in various forms such as, without limitation, a monitor, a screen, a hologram, and the like. In addition, the user interface 305 may include various devices, components and/or circuitry for receiving various types of inputs, such as, without limitation, a keyboard, a mouse, a joystick, etc., for the user to input data to the server.

The server controller 307 includes, for example, a processor or circuitry for performing the overall control of the server, and in particular, may control the operation of estimating the location of the electronic device and correcting the estimated location. In addition, the server controller 307 may determine a user's presence or absence in the presence determination area, based on the estimated and corrected location information of the electronic device. Also, the server controller 307 may perform a predetermined corresponding control operation, depending on a result of determining the user's presence or absence in the presence determination area. A detailed operation of the server controller 307 will be described below in detail.

FIG. 5A is a diagram illustrating signal flows among respective nodes for estimating and correcting the location of an electronic device and performing subsequent operations according to an example embodiment of the present disclosure.

In this embodiment of FIG. 5A, the electronic device 100 is configured to allow a user to carry or wear or to be equipped in a user's vehicle, and also is capable of wireless communication, as earlier described in FIG. 1. The wireless communication device 200 may be fixed at a specific position. Although only one wireless communication device is shown in FIG. 5A, the electronic device 100 actually performs the same operation with a plurality of wireless communication devices. FIG. 5A illustrates only one wireless communication device for convenience of explanation and for simplification of drawings. Similarly, although a plurality of electronic devices may exist, FIG. 5A shows only one. The server 300 is capable of acquiring location information of the electronic device 100, determining whether the electronic device 100 is present in or absent from a predetermined presence determination area, and performing a corresponding control operation.

The wireless communication device 200 may generate a certain identifying signal and transmit the signal to electronic devices capable of communicating with the wireless communication device 200 in accordance with respective wireless communication schemes. For example, if the wireless communication device 200 is a base station of a cellular network, the wireless communication device 200 may transmit a pilot signal and/or cell identifier information. If the wireless communication device 200 is an access point (AP) of a Wi-Fi network, the wireless communication device 200 may periodically broadcast a signal for informing its coverage. If the wireless communication device 200 is a satellite, it may transmit a reference signal containing satellite information. In addition, each fixed node of any other wireless communication system may transmit a discovery signal or a broadcast signal for finding the electronic device that will communicate with that fixed node.

At step 400, the electronic device 100 may estimate the location information thereof by using the strength of signals received from a plurality of nodes (i.e., the wireless communication devices 200) of the wireless communication network. This estimation technique is well known in the art, so that related examples will be briefly described hereinafter.

For example, if the electronic device 100 receives satellite information and signals from a plurality of satellites, the location of the electronic device 100 may be estimated using the strength and angles of the signals received from the respective satellites. Then, the estimated location may be corrected using map information. In another example, the electronic device 100 may estimate the location thereof, based on the strength of signals received from a plurality of base stations of the cellular network. In this case, the estimated location may be an absolute location or a relative location, depending on whether the coordinates of the base stations are known or unknown.

Meanwhile, when the user who wears or carries the electronic device 100 enters a building, there may arise a problem that the electronic device 100 fails to receive the satellite signals or has a considerable error of the received satellite signals. Even in case of location estimation based on the strength of the base station signals, a considerable error may be caused. Therefore, in these cases, the electronic device 100 may use signals received from the Wi-Fi devices installed in the building.

As briefly described above, the electronic device 100 may perform location estimation based on signal strength at step 400 by using at least one of the above schemes.

Then, at step 402, the electronic device 100 may generate a correction value for the estimated location by using a sensor. Specifically, in case of having map information, the electronic device 100 may acquire user's movement information from the sensor. For example, using the user's movement information obtained from at least one or more sensors such as an angular velocity sensor, an acceleration sensor, and an altitude sensor (or atmospheric pressure sensor), the electronic device 100 may estimate a moving direction, a moving speed, and a current altitude.

After estimating the location at step 400 and generating the correction value for correcting the estimated location at step 402, the electronic device 100 may determine the location thereof by correcting the estimated location according to the correction value at step 402. The determined location information may be stored in the terminal memory 105 equipped in the electronic device 100. In a certain example embodiment, when correcting the location, the electronic device 100 may further determine whether the determined location is placed in a predetermined presence determination area and whether the determined location is placed in a boundary area of the presence determination area. This is, however, optional and may be performed by the server 300 at step 406 to be discussed below. Meanwhile, the electronic device 100 may use previously stored map information and also perform additional correction by using second correction information. A detailed description will be given below.

Thereafter, at step 404, the electronic device 100 may transmit the determined location information to the server 300. At this time, the electronic device 100 may simply transmit the coordinates of the determined location, or may further transmit all of the estimated location information, the correction values, and any other information used for correction. In addition, the electronic device 100 may also transmit information about whether the determined location is in the presence determination area or in the boundary area. Further, the electronic device 100 may transmit such information directly to the server 300 using a network such as a wireless Internet, or indirectly to the server 300 via the wireless communication device 200.

The server 300 that receives the location information of the electronic device 100 directly from the electronic device 100 or indirectly via the wireless communication device at step 404 may provide a particular service at step 406, based on the received location information. At step 404, the server 300 may also receive information about whether the electronic device 100 is in the presence determination area. However, if such information is not received, the server 300 may determine at step 406 whether the electronic device 100 is in the presence determination area. The location information of the electronic device 100 may be stored in the server memory 303 alone or together with any other received information.

The particular service provided by the server 300 at step 406 may be, for example, a service of turning on/off the lighting devices and/or operating the air conditioning system according to a user's movement as described above. Such a service may be provided when a given number of persons is located in the presence determination area. For example, the lighting devices installed in a meeting room may be turned on when only one person enters the meeting room, and prepared presentation material may be displayed on a screen when all attendances are detected in the meeting room.

In addition, a great variety of services may be provided by the server 300. In a case of a workplace, a school, a hotel, etc., various types of services such as the air conditioning system and lighting control may be provided. In a case of a private residence, a library, a public office, etc., a security control service may be provided by determining whether the user is present or absent. In a case of a game, an electric vehicle charging, an athletic facility, a shop, etc., various kinds of event information may be provided.

Figure 5B:
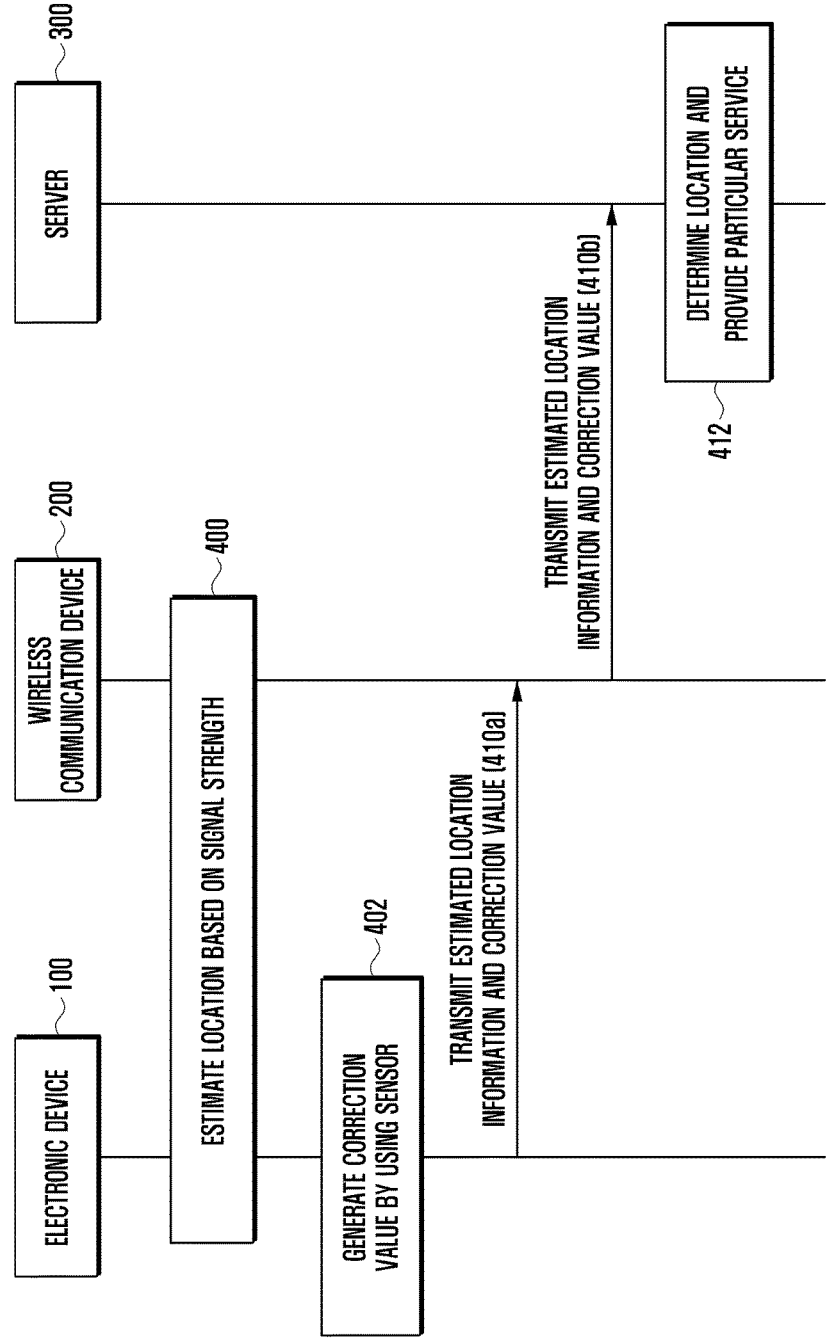
FIG. 5B is a diagram illustrating signal flows among respective nodes for estimating and correcting the location of an electronic device and performing subsequent operations according to another example embodiment of the present disclosure.

FIG. 5B is a diagram illustrating signal flows among respective nodes for estimating and correcting the location of an electronic device and performing subsequent operations according to another example embodiment of the present disclosure.

The configuration of FIG. 5B is similar to that of FIG. 5A described above. Therefore, similar parts will only be described briefly, and other parts will be described in greater detail. In FIG. 5B, the same reference numerals are used for the same parts as in FIG. 5A.

At step 400, the electronic device 100 may estimate the location information thereof by using the strength of signals received from a plurality of nodes (i.e., the wireless communication devices 200) of the wireless communication network. Then, at step 402, the electronic device 100 may generate a correction value (or information) for the estimated location information by using the sensor.

At step 400, the electronic device 100 may estimate the location information, or may acquire and store only signal strength information. In addition, at step 402, the electronic device 100 may generate the correction value by using the sensors, or may only store information received from the sensors.

The location information estimated by using the signal strength and the correction value generated by using sensing values may be transmitted to the server 300 via the wireless communication device 200 at steps 410a and 410b. As discussed above in FIG. 5A, the estimated location information and the generated correction value may be transmitted directly to the server 300 without passing through the wireless communication device 200. In addition, the electronic device 100 may measure the signal strength from a plurality of wireless communication devices. For example, as previously described in FIG. 1, the strength of signals received from the wireless communication devices 200-1, 200-2 and 200-3 may be measured. Then, the electronic device 100 may transmit the signal strength information to the respective wireless communication devices 200-1, 200-2 and 200-3, each of which may deliver the signal strength information to the server 300. At this time, the electronic device 100 may further transmit the correction value generated by using the sensor to the server 300 directly or via the wireless communication device 200.

In the above example, the electronic device 100 that measures the strength of signals from the plurality of wireless communication devices 200-1, 200-2 and 200-3 may alternatively transmit the signal strength information to one of the wireless communication devices 200-1, 200-2 and 200-3. In this case, the wireless communication device that receives the signal strength information from the electronic device may be the wireless communication device having the highest measured signal strength.

After receiving the estimated location information and the correction value from the electronic device 100 at steps 410a and 410b, the server 300 may determine location of the electronic device 100 and provide a particular service at step 412. The operation of determining the location may be the same as performed by the electronic device 100 in FIG. 5A. For example, the server 300 may utilize map information and location information of the wireless communication devices, estimate the location based on the signal strength from each wireless communication device, and correct the estimated location by using the correction value generated by the sensor of the electronic device 100. In addition, the server 300 may further determine whether the location is in a predetermined presence determination area and whether the location is placed in a boundary area of the presence determination area. For this, the server 300 may use previously stored map information. A detailed description will be given below.

After the location of the electronic device 100 is determined and thus the presence or absence of the electronic device 100 within the presence determination area is determined, the server 300 may provide a particular service. This service may be one of previously described services in FIG. 5A or any other service.

Figure 6:
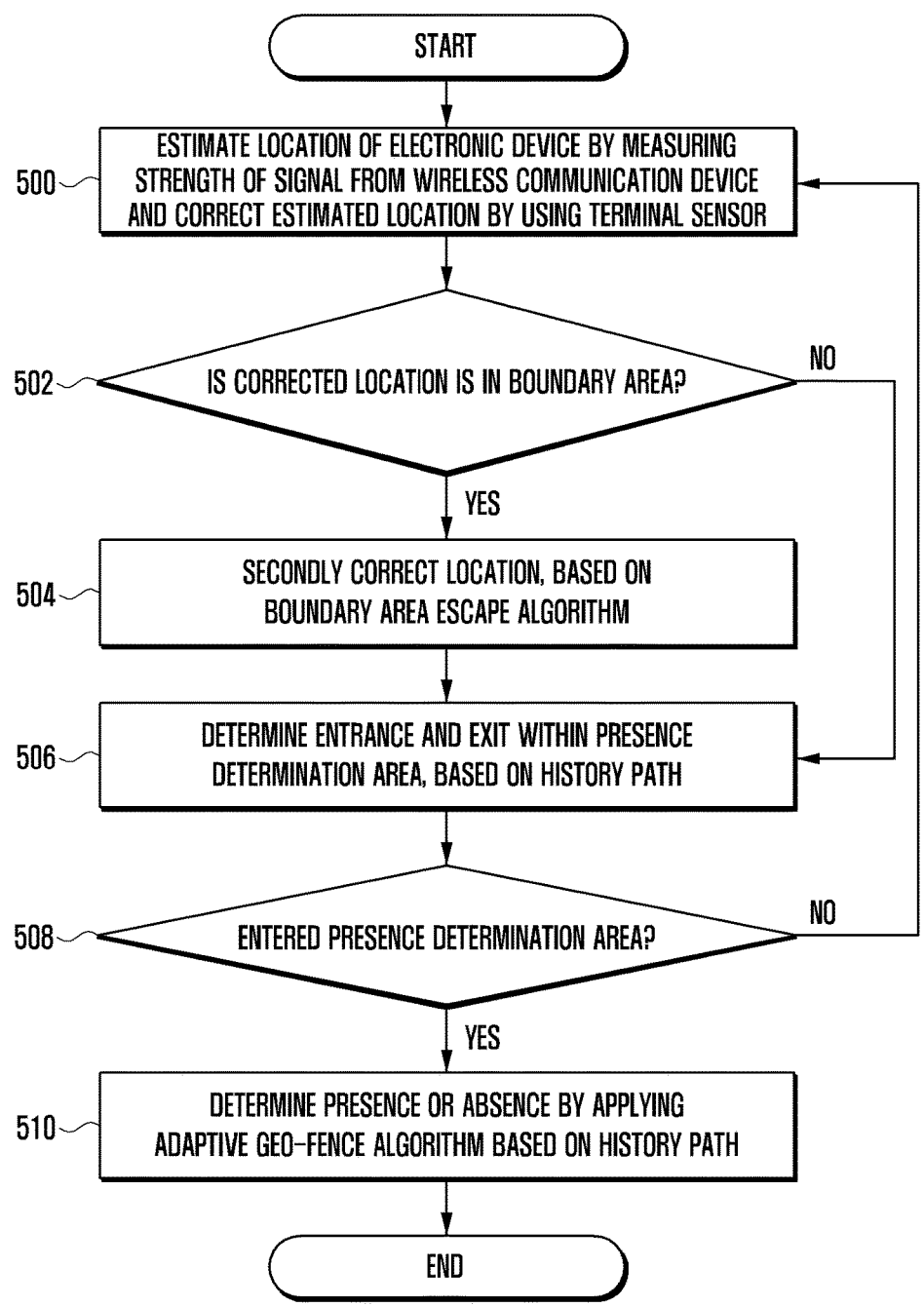
FIG. 6 is a flow diagram illustrating operations of determining the location of an electronic device according to an example embodiment of the present disclosure.

FIG. 6 is a flow diagram illustrating operations of determining the location of an electronic device according to an example embodiment of the present disclosure.

As described above, the operations shown in FIG. 6 may be performed by the electronic device 100 or the server 300. Hereinafter, it will be assumed that the electronic device 100 performs the operations of FIG. 6.

At step 500, the terminal controller 111 of the electronic device 100 may acquire the first location information by receiving signals from the wireless communication devices through the terminal wireless communication unit 101 and then measuring the strength of the received signals. For example, if the strength of signals from three different wireless communication devices is measured, and if the location information of each wireless communication device is known, three circles are produced on the basis of the strength of signals received from the respective wireless communication devices, and then the location of the electronic device may be estimated within the intersection of the circles. Further, if the intersection is wide, the location of the terminal may be estimated using technique of determining a centroid of the intersection.

In addition, the electronic device 100 may correct the estimated location thereof by using a sensor(s). In this case, the electronic device may acquire user's moving direction and speed through the sensor(s), and correct the estimated location by calculating how much the user moves from the position where the signal strength is measured. Also, if the electronic device 100 has map information, the location correction may be performed more smoothly. In this case, since a user's movement path can be obtained based on the map information, more accurate correction may be possible.

Then, at step 502, the terminal controller 111 may check whether the estimated location of the electronic device 100 is in the boundary area of a presence determination area. In this disclosure, the presence determination area is a certain zone predetermined by the server 300. As discussed above, the presence determination area may be an actually and physically divided zone and/or a virtually and logically divided zone. For example, in case of the above-described meeting room, both the physical zone and the virtual zone may be defined together. On the other hand, in case of controlling the lighting devices in the hallway, only the virtual zone may exist without the physical zone. Strictly, the presence determination area may indicate the inside of the presence determination area shown in FIG. 7D. Also, the boundary area of the presence determination area may indicate a thickness region between the inside and outside of the presence determination area shown in FIG. 7D. A scheme of setting the thickness (or width) of the boundary area will be described below in detail.

The reason that the terminal controller 111 estimates and firstly corrects the location of the electronic device 100 at step 500 and then check at step 502 whether the corrected location is in the boundary area of the presence determination area is for more accurately determining whether the electronic device 100 is present in or absent from the presence determination area. Information about the presence determination area and the boundary area may be previously stored in the terminal memory 105 in the form as shown in FIG. 7D. Therefore, at step 502, the terminal controller 111 may check whether the current, corrected location is in the boundary area of a presence determination area. If so, the terminal controller 111 performs step 504, and if not, the terminal controller 111 performs step 506. The boundary area of the presence determination area will be described below in detail.

At step 504, the terminal controller 111 may correct the user location, based on a boundary area escape algorithm for location correction. This escape algorithm will also be discussed below in detail. Then, at step 506, the terminal controller 111 may determine, based on history information, the entrance and exit within the presence determination area.

Then, at step 508, the terminal controller 111 may check whether the electronic device 100 enters the presence determination area. If so, the terminal controller 111 performs step 510. If not so, the terminal controller 111 returns to step 500.

At step 510, the terminal controller 111 may finally determine the presence or absence by applying an adaptive geo-fence algorithm based on a history path. The history path may correspond to the location information of the electronic device 100 stored predetermined number of times. For example, if four pieces of location information are stored at time points t1, t2, t3 and t4, if the first time point t1 is the oldest, and if the fourth time point t4 is the latest, the history path may be obtained from the four pieces of location information from the first time point t1 to the fourth time point t4. This determination applying the adaptive geo-fence algorithm will be described below in detail.

The above-described operations are performed by the electronic device 100. Alternatively, such operations may be performed by the server 300 as they are. For example, at step 500, the server 300 may receive the signal strength measured by the electronic device 100 directly from the electronic device or via the wireless communication device, and then estimate the location of the electronic device 100 based on the received signal strength. Namely, the only difference is that the subject of performing the operations is changed from the electronic device 100 to the server 300. On the other hand, depending on situations, the operation of step 500 may be performed by the electronic device 100, and the remaining operations from step 502 may be performed by the server 300. In the end, the operations shown in FIG. 6 may be selectively performed by either the electronic device 100 or the server 300.

Now, the boundary area escape algorithm and a scheme of determining presence/absence in the presence determination area by using history information will be described with reference to FIG. 7A.

Figure 7A:
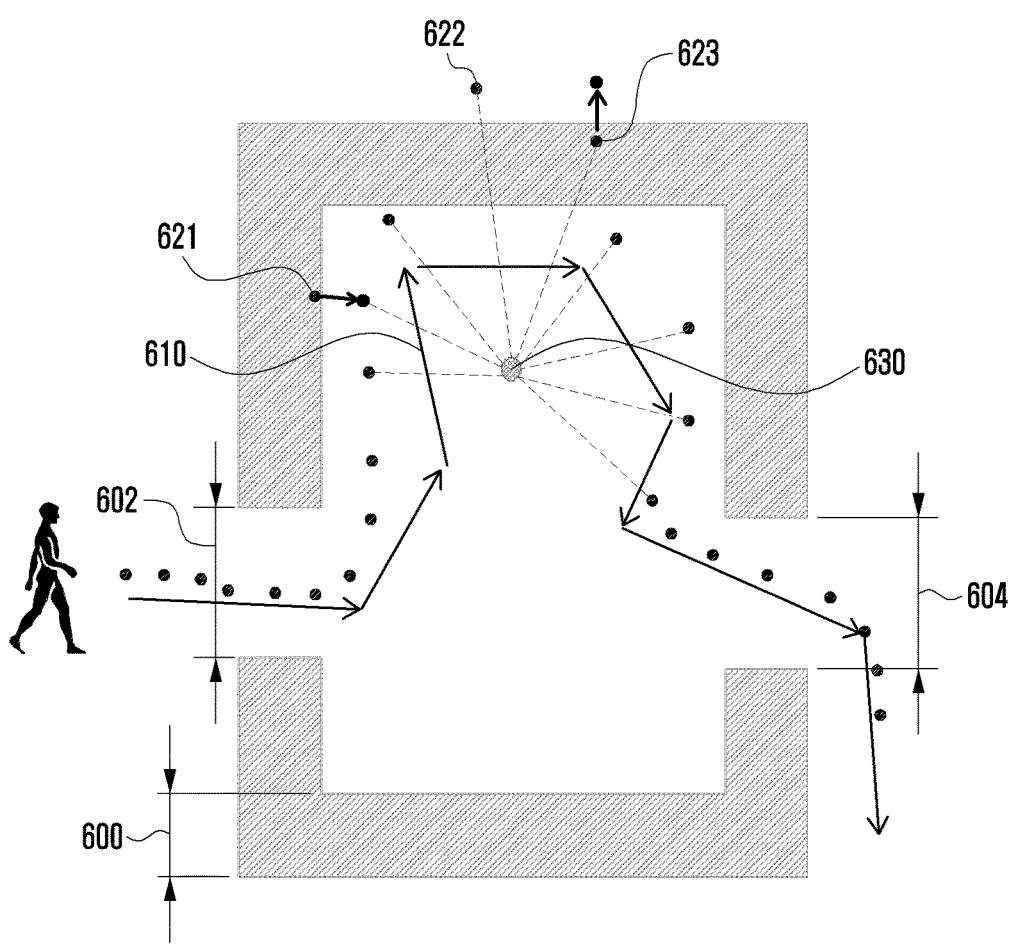
FIG. 7A is a diagram illustrating a presence determination area and a boundary area escape algorithm according to an example embodiment of the present disclosure.

FIG. 7A is a diagram illustrating a presence determination area and a boundary area escape algorithm according to an example embodiment of the present disclosure. It is assumed that FIG. 7A shows a meeting room. The meeting room may have a physical structure by which inside and outside areas are distinguished. In this disclosure, such a physical structure between the inside and outside areas is referred to as a boundary area 600 having a certain thickness (or a width as seen from the drawing). Also, if there is such a physical structure, physical structure information may be used together with the history information to determine the presence/absence in the presence determination area.

The boundary area 600 exists between the inside and outside of the presence determination area. A scheme of setting the thickness of the boundary area 600 will be described below. The boundary area 600 has two doorways 602 and 604, for example. The boundary of the presence determination area may be not applied to the doorways 602 and 604, or the doorways 602 and 604 may be considered as the inside or outside area of the presence determination area through a suitable correction algorithm. Also, for convenience of calculation or simplification of the presence determination area, the doorways may be ignored.

In FIG. 7A, each dot may correspond to coordinate information of the estimated location of the electronic device 100 or the corrected location of the estimated location. In this description, it is assumed that each dot indicates the coordinates of the corrected location. Also, it is assumed that the user who carries or wears the electronic device 100 actually moves as indicated by a reference numeral 610. As shown, the moving path 610 may be identical with or differ from the respective dots indicating the coordinates of the corrected location.

In FIG. 7A, a reference numeral 621 indicates a case where the estimated and corrected location is placed within the boundary area of the presence determination area. In this case, an additional correction is required, and thus a boundary area escape algorithm may be used. When the boundary area escape algorithm is applied, a certain location 621 which is placed within the boundary area and closer to the inside of the presence determination area may be corrected to a new location inside the presence determination area. In contrast, when the boundary area escape algorithm is applied, another location 623 which is placed within the boundary area and closer to the outside of the presence determination area may be corrected to a new location outside the presence determination area.

In the latter case, a new location obtained by applying the boundary area escape algorithm is rather distant from the actual location. Namely, as indicated by a reference numeral 623, it may be seen as if the user suddenly moves out of the meeting room from inside the meeting room. In order to prevent this error, a second correction may be performed using a historical path which is obtained from the history information accumulated several times (e.g., 3-5 times or more) from the current position information. Also, at this time, whether or not the boundary area of the presence determination area includes the actual physical boundary may be used together.

If the boundary area of the presence determination area includes the actual physical boundary, and if the location 623 is corrected to a new location outside the presence determination area, this new location is an impossible location in consideration of a previous history. Namely, considering that the user is located inside the meeting room having the doorways 602 and 604, it is impossible for the user to suddenly move as indicated by a reference number 623. Therefore, the history information alone or together with the physical boundary information may be used for the second correction of the location estimation.

The history information may also be applied to another estimated and corrected location 622 that is found outside the meeting room. If there are such a large number of errors, it is natural that errors may be caused in determining the presence or absence in the presence determination area.

Meanwhile, a scheme of acquiring information about a centroid by using the history information may be applied. In FIG. 7A, a reference number 630 indicates a centroid of the coordinates of all locations after entrance into the meeting room. The use of such a centroid may be limited to some cases, which will be described below in detail.

Referring to FIG. 7A again, the user carrying or wearing the electronic device 100 enters the meeting room through the left doorway 602. Then, the user moves in the meeting room along the moving path 610. In this case, the user's locations are estimated and firstly corrected as discussed above and also represented as respective dots.

Unlike the user's actual moving path 610, the estimated and corrected locations may be sometimes found in the boundary area as shown by reference numerals 621 and 623. Further, even though the user is actually located inside the meeting room, the estimated and corrected locations may be erroneously found outside the meeting room as shown by a reference numeral 622. If the boundary area of the presence determination area is a physical structure, the user cannot actually stay at the locations 621 and 623 and also cannot move to the location 622. Further, even though there is no physical constraint, the locations 622 and 623 are erroneous locations that cannot be moved to in time.

As discussed hereinbefore, if the user's location is not corrected depending on whether the user can move when determining whether the user is present or not in the presence determination area, the server 300 may be difficult to provide a suitable service or may operate improperly. Therefore, if any estimated and corrected location is found within the boundary area of the presence determination area, the server 300 may perform different controls depending on whether to determine the found location to be a location inside the presence determination area or outside the presence determination area.

In addition, if there is any physically separated area in the map information, the user location may be corrected using the existing movement history information. In this case, the user location may be converged to the centroid 630. Related descriptions will be given below in detail.

Figure 7B:
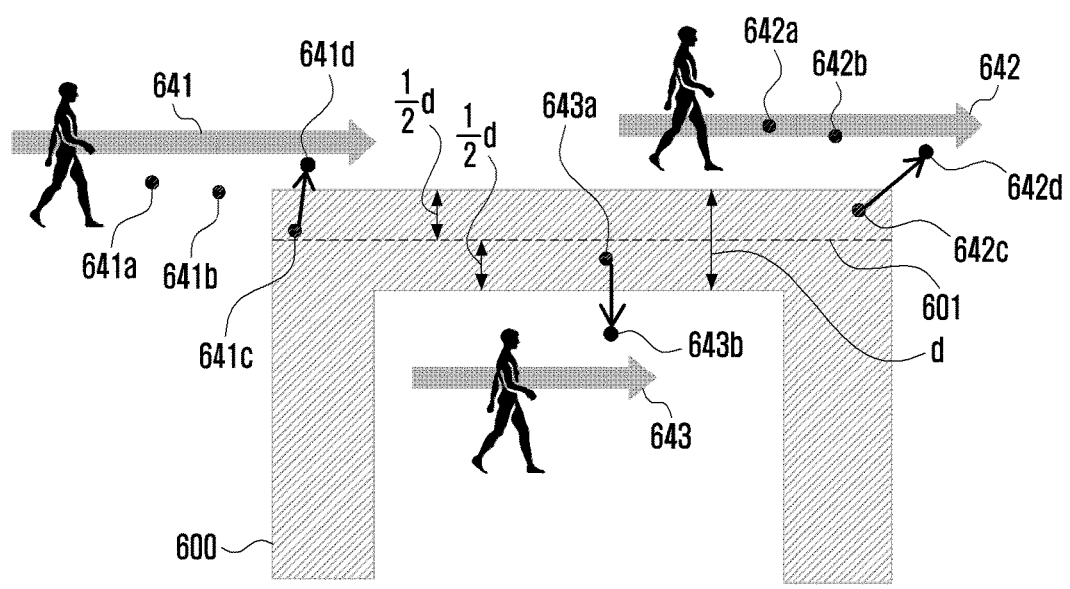
FIG. 7B is a diagram illustrating an escape from a boundary area of a presence determination area by using user's movement history information according to an example embodiment of the present disclosure.

FIG. 7B is a diagram illustrating an escape from a boundary area of a presence determination area by using user's movement history information according to an example embodiment of the present disclosure.

Referring to FIG. 7B, three cases are illustrated: a case where the user moves as indicated by a reference numeral 641, a case where the user moves as indicated by a reference numeral 642, and a case where the user moves as indicated by a reference numeral 643.

First, when the user carrying or wearing the electronic device 100 moves as indicated by the reference numeral 641, the estimated and corrected locations 641a, 641b and 641c may be determined in time sequence. In this case, the estimated and corrected location 641c may be found within the boundary area 600 of the presence determination area. Then, the electronic device 100 may escape this location 641c from the boundary area 600 by using the above-discussed escape algorithm and determining whether this location 641c is closer to the outside or closer to the inside from a center line 601 of the boundary area 600. The center line 601 of the boundary area 600 may be calculated in a very simple form. For example, the boundary area 600 of the presence determination area is defined as a space between the inner and outer borders of the presence determination area. If the thickness of the boundary area 600 of the presence determination area is d, the boundary escape may be determined on the basis of the center line 601 corresponding to a half of the thickness.

Therefore, by applying the escape algorithm, the location 641c found in the boundary area 600 may be corrected to a new location 641d "escaped" from the boundary area 600.

Further, in a case of using the history information, namely, using the former locations 641*a* and 641*b*, the location 641*c* may be moved to a predictable new location 641*d*.

The above approach may be equally applied to another case where the user moves as indicated by the reference numeral 642. If the user carrying or wearing the electronic device 100 moves as indicated by the reference numeral 642, the estimated and corrected locations 642*a*, 642*b* and 642*c* may be determined in time sequence. In this case, the estimated and corrected location 642*c* may be found within the boundary area 600 of the presence determination area. Then, the electronic device 100 may escape this location 642*c* from the boundary area 600 by using the above-discussed escape algorithm and determining whether this location 642*c* is closer to the outside or closer to the inside from the center line 601 of the boundary area 600. Namely, by applying the escape algorithm, the location 642*c* found in the boundary area 600 may be corrected to a new location 642*d* "escaped" from the boundary area.

Further, in a case of using the history information, namely, using the former locations 642*a* and 642*b*, the location 642*c* may be moved to a predictable new location 642*d*.

Similarly, if the user moves inside the presence determination area as indicated by the reference numeral 643, the estimated and corrected location 643*a* may be found in the boundary area 600. In this case as well, the location 643*a* may be corrected to a new location 643*b* in the y-axis direction between the x-axis direction (i.e., horizontal direction, e.g., longitude) and the y-axis direction (i.e., vertical direction, e.g., latitude), based on the user's former staying or moving information. Thus, the user's location, namely, the location of the electronic device 100, may be determined inside the presence determination area. Also, the same result may be obtained when the boundary escape algorithm is applied. Namely, the boundary escape may be performed by determining whether the location 643*a* is closer to the inside or closer to the outside from the center line 601 corresponding to a half of the thickness.

Figure 7C:
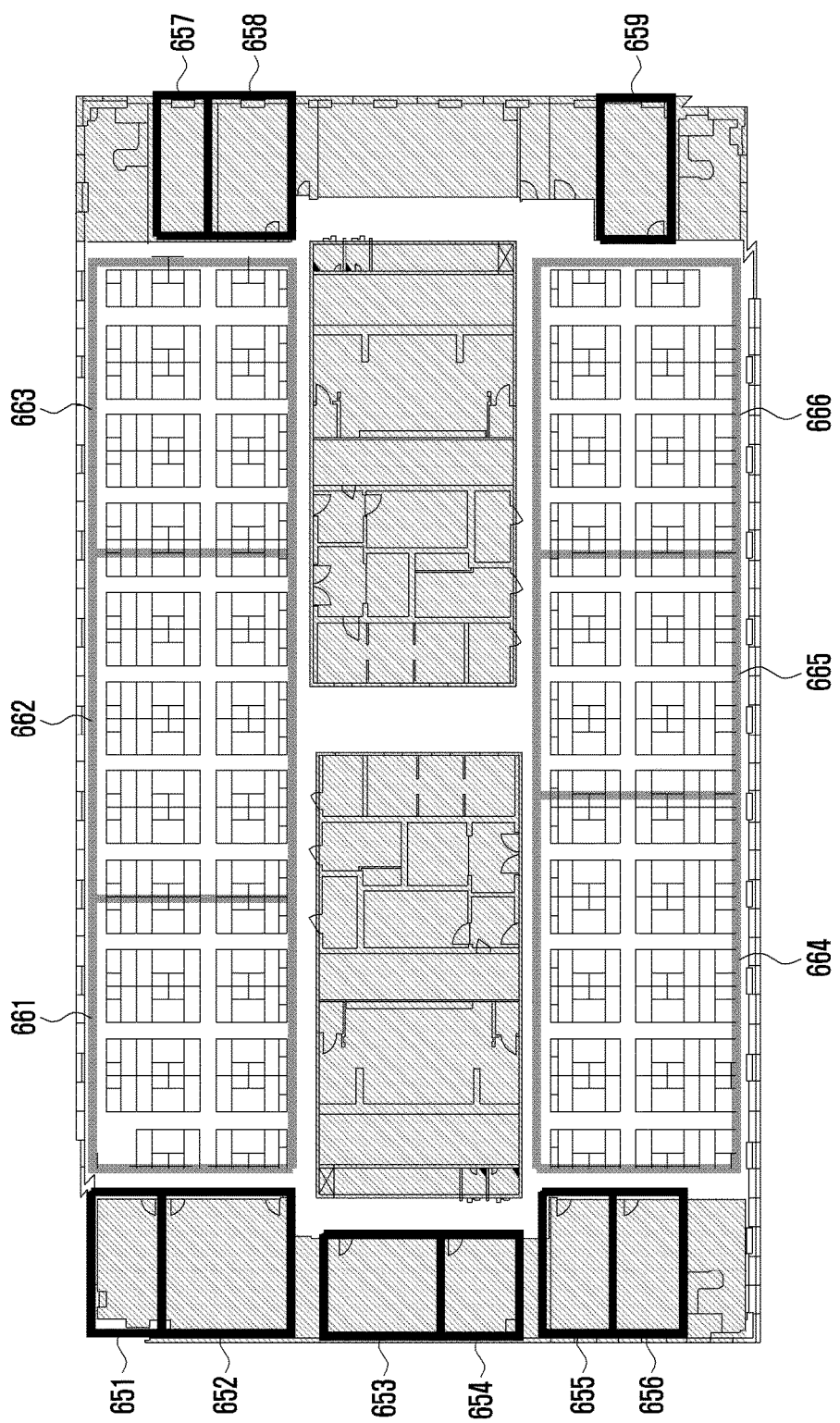
FIG. 7C is a diagram illustrating a presence determination area established in a building according to an example embodiment of the present disclosure.
Figure 7D:
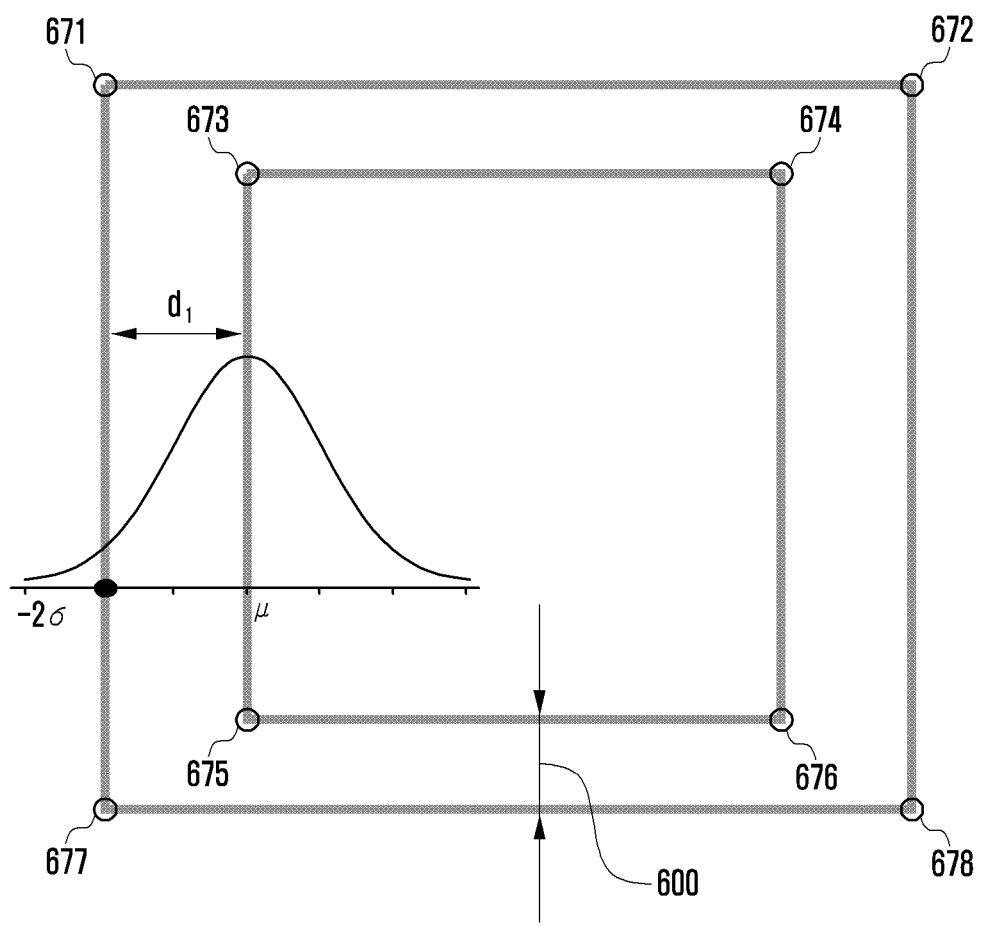
FIG. 7D is a diagram illustrating a scheme of setting the thickness of a boundary area of a presence determination area according to an example embodiment of the present disclosure.

FIG. 7C is a diagram illustrating a presence determination area established in a building according to an example embodiment of the present disclosure. In FIG. 7C, reference numerals 651, 652, 653, 654, 655, 656, 657, 658 and 659 may denote cases in which the boundary of the presence determination area is established from a physical boundary. In addition, reference numerals 661, 662, 663, 664, 665 and 666 may denote cases where the boundary of the presence determination area is established regardless of a physical boundary. Alternatively, reference numerals 651, 652, 653, 654, 655, 656, 657, 658 and 659 may indicate cases where the boundary of the presence determination area is established without any physical boundary, and reference numerals 661, 662, 663, 664, 665 and 666 may indicate cases where the boundary of the presence determination area is established from a physical boundary. Thus, in a building, physical boundaries and virtual boundaries may exist together, or only virtual boundaries may exist without any physical boundary. In other words, the virtual boundary area may be established regardless of a physical boundary. In addition, the thickness (or width) of the virtual boundary area should be set. This will be described below with reference to FIG. 7D.

Meanwhile, in case of using an indoor positioning technique, it is inevitable that an error occurs. Therefore, a suitable correction technique is required as discussed above. Normally, the error range of the indoor positioning technique may be reduced to about 2 meters. However, the error range of 2 meters is still considerable because indoor rooms may often have a width of only 3 to 4 meters. In addition, there may be a noise region in which it is difficult to determine, based on only the user's location (coordinate) information, whether the user is located inside or outside the presence determination area. This noise region may be located on the boundary area described above.

Therefore, when information about a physical boundary area such as a partition, a wall, and the like is added, more precise correction of location may be possible. In addition, if there is no actual physical division, the virtual boundary area should be established in an open space based on locations according to logical boundary concept for device control, air conditioning, etc.

In addition, when the boundary area of the presence determination area is established using a physical shape or structure, the width of the boundary area may be set differently depending on physical materials, height, and the like. Also, the boundary areas may have different widths as needed. For example, in case of the presence determination area having a rectangular shape, namely, having four boundary areas corresponding to four sides, only one boundary area may have a different width, two boundary areas may have different widths, or all boundary areas may have different widths. This may be determined by considering various factors such as the physical environment or the arrival environment of radio waves, the interference environment of radio waves, and the like. For example, in case of setting all widths differently, upper, lower, left and right boundary areas which correspond to four sides of the presence determination area may have widths of 60, 50, 10 and 30, respectively.

Meanwhile, in a case of an open space having no physical shape or structure or in case of a meeting room formed of glass, it is difficult to clarify the boundary area based on physical properties. In this case, a scheme of setting the width of the boundary area may be an important factor.

Also, if the electronic device 100 is located in the vicinity of the boundary area of the presence determination area, many wireless communication devices may be used for estimating the location of the electronic device 100 before the escape algorithm is applied. Namely, for location estimation based on received signal strength, it may be desirable to use five or more wireless communication devices rather than generally use three wireless communication devices.

FIG. 7D is a diagram illustrating a scheme of setting the thickness of a boundary area of a presence determination area according to an example embodiment of the present disclosure.

The scheme of setting the thickness (or width) 600 of the boundary area is derived from experimental results after the presence determination area is established. In an example embodiment, the scheme of setting the thickness 600 of the boundary area is derived on the assumption that the reliability of 95% is maintained. In comparison with this embodiment shown in FIG. 7D, the thickness 600 of the boundary area may be set to be thinner in case of lower reliability and also set to be thicker in case of higher reliability. The thickness may be determined in the unit of millimeter or centimeter. In addition, the thickness may be determined according to accuracy and response time required for determining a user's presence or absence.

According to experimental results, the thickness of the boundary area may be determined between 10 centimeters and 2 meters. The thickness may vary depending on a place where the presence determination area is defined, and/or depending on surrounding environments. For example, if the determination of presence/absence is needed for controlling street lights on the walkway, a fast response speed is not necessary considering a person's moving speed and the range of street lights. On the other hand, if the determination of presence/absence is performed in a meeting room within a building, a higher accuracy and a very fast response speed is desirable in comparison with the above case of controlling the street lights. Further, the accuracy and response speed may vary depending on the time zone. For example, in case of controlling lighting in the same meeting room, the accuracy and response speed required may be different in the daytime and in the nighttime.

Also, there may be a region capable of accurate location estimation and a region having poor accuracy of location estimation. Even in a case capable or incapable of accurate location estimation and correction using the sensor(s) of the electronic device, regardless of using the wireless communication devices of the same or different types, the accuracy and response speed may vary. Like this, the accuracy and response speed in the determination of presence/absence may be determined according to various conditions and environments.

In addition, the presence/absence determination accuracy may be defined as the ratio of the total number of presence/absence determination times, performed in the presence determination area, to the number of times being determined as absence (i.e., true negative) when actually the user is absent from the presence determination area, or defined as the ratio of the total number of presence/absence determination times, performed in the presence determination area, to the number of times being determined as presence (i.e., true positive) when actually the user is present in the presence determination area. Also, the presence/absence determination response speed may be defined as the total time required for presence/absence determination with respect to the presence determination area. For example, a time span from the time when the user actually enters a specific space defined for presence/absence determination to the time spent for determining the presence/absence in the space may be defined as the presence determination response speed. Also, a time span from the time when the user actually exits the presence determination area to the time spent for determining the absence may be defined as the absence determination response time. That is, the response speed may be classified into the presence determination response speed and the absence determination response time. Also, an average of both may be defined as the response speed. Like this, the response speed may be defined in various manners and forms according to cases or control targets.

In addition, the thickness (width) of the boundary area may be determined in various manners, depending on the accuracy and response speed of presence/absence determination. For example, for a region that requires a higher accuracy, the thickness of the boundary area may be set to be thick so as to increase the accuracy. Also, for a region that requires a faster response speed, the thickness may be set to be thin so as to increase the response speed. In the former example, a higher accuracy is required for security in a place for browsing important documents. Therefore, in such a case, it is desirable to set the thickness to be as thick as possible. For example, a security document reading room may have the boundary area of very great thickness such as 2 meters.

On the other hand, there may be cases of requiring a quick determination speed. For example, when a response speed of less than 1 second is required in the vicinity of a jewelry store in the late night or in case of determining the presence or absence of a fast moving object, the width of the boundary area is set to be very thin. For example, the width of the boundary area may be set to be as thin as 20 centimeters, so that any intrusion may be quickly detected and a suitable operation may be immediately performed.

According to another example embodiment, weight factors may be assigned to the accuracy and speed of presence/absence determination required for each service, and the thickness of the boundary area may be determined depending on the assigned weight factor. These weight factors may be determined based on the importance of accuracy versus a fast response speed. Then, based on the determined weight factor and through experiments, the thickness of the boundary area may be determined at each place where the presence determination area is defined. If the results of experiments are substantially the same, or if a table is constructed based on the results of experiments, the time for setting the thickness of the boundary area may be saved.

In FIG. 7D, the thickness (d1) 600 of the boundary area may be set using the average error and the standard deviation between an actual location and an estimated and corrected location obtained by the electronic device 100. For example, if the error between the actual location and the estimated and corrected location is $\mu$, and if the standard deviation is $\sigma$, the thickness (d1) 600 of the boundary area that satisfies the reliability of 95% may be $2\sigma$.

Since this value is obtained through experiments, it may vary depending on the performance of the electronic device and/or the location correction algorithm. Namely, after the location is estimated based on the signal strength between the electronic device and the wireless communication devices and then the estimated location is corrected using the sensor, the above-discussed thickness is obtained using the average error and the standard deviation. Therefore, in case of acquiring and estimating the location in any other manner, the thickness of the boundary area may have to be set differently. In addition, when the reliability is increased or decreased, the thickness of the boundary area may be also changed.

Figure 8A:
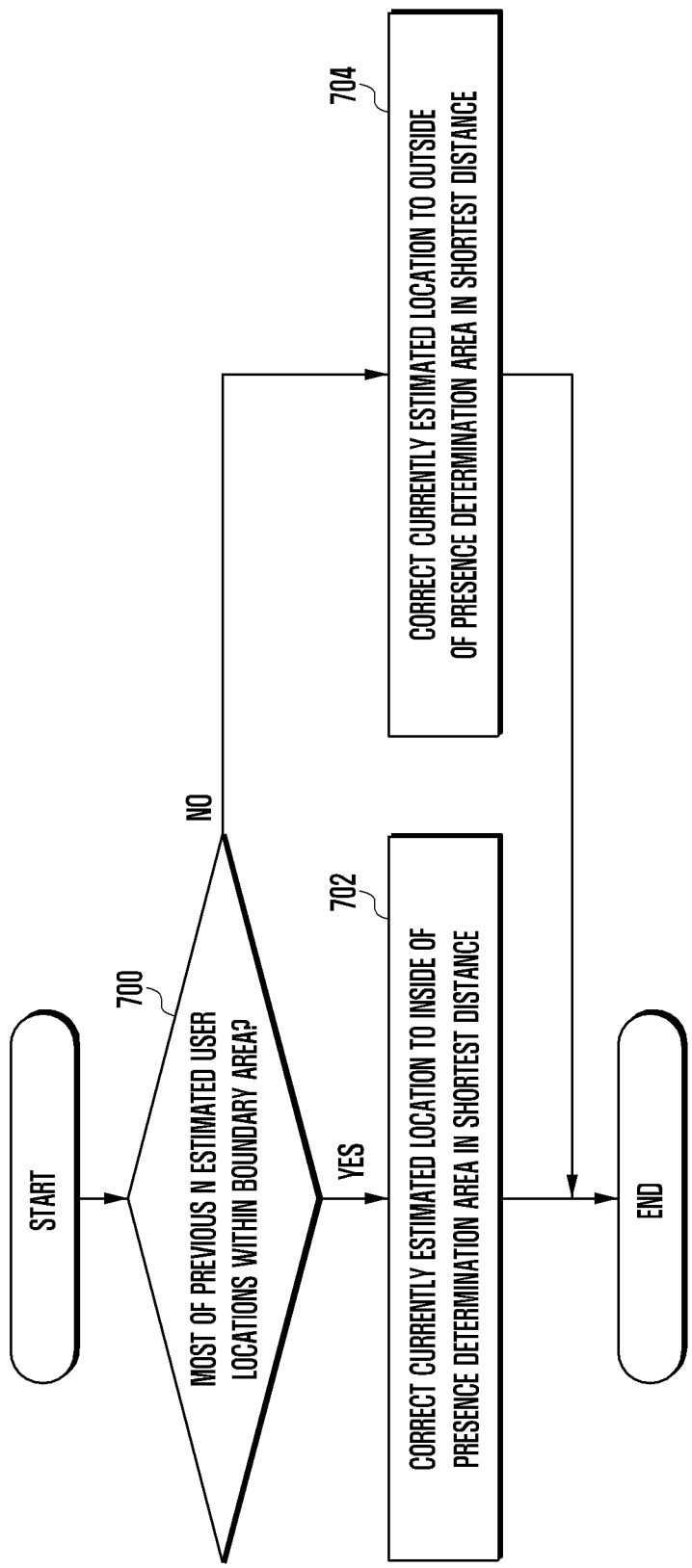
FIG. 8A is a flow diagram illustrating operations of escaping a boundary area according to an example embodiment of the present disclosure.

FIG. 8A is a flow diagram illustrating operations of escaping a boundary area according to an example embodiment of the present disclosure.

The operations shown in FIG. 8A may be performed by the electronic device 100 or the server 300. Hereinafter, it will be assumed that the electronic device 100 performs the operations of FIG. 8A.

At step 700, the terminal controller 111 may check whether most of previous N estimated user locations are within the boundary area. Namely, when a currently estimated location exists in the boundary area of the presence determination area as described with reference to FIGS. 7A and 7B, the previous N pieces of information before the currently estimated location may be used at step 700. If N is 5, the terminal controller 111 may determine whether most of the previous five pieces of information are located within the boundary area. For example, it is checked whether three or more of the five pieces of information before obtaining the currently estimated location are positioned inside the boundary area.

If it is determined at step 700 that most of the N estimated user locations are within the boundary area, the terminal controller 111 performs step 702. Otherwise, the terminal controller 111 performs step 704.

At step 702, the terminal controller 111 may correct the currently estimated location to the inside of the presence determination area in the shortest distance. Through this correction, the user is in a state of staying within the presence determination area.

On the other hand, if it is determined at step 700 that most of the N estimated user locations are not within the boundary area, the terminal controller 111 may correct the currently estimated location to the outside of the presence determination area in the shortest distance at step 704.

As described above, the electronic device 100 may correct the location thereof so as not to be in the boundary area, thus removing uncertainty in control at the server 300.

Figure 8B:
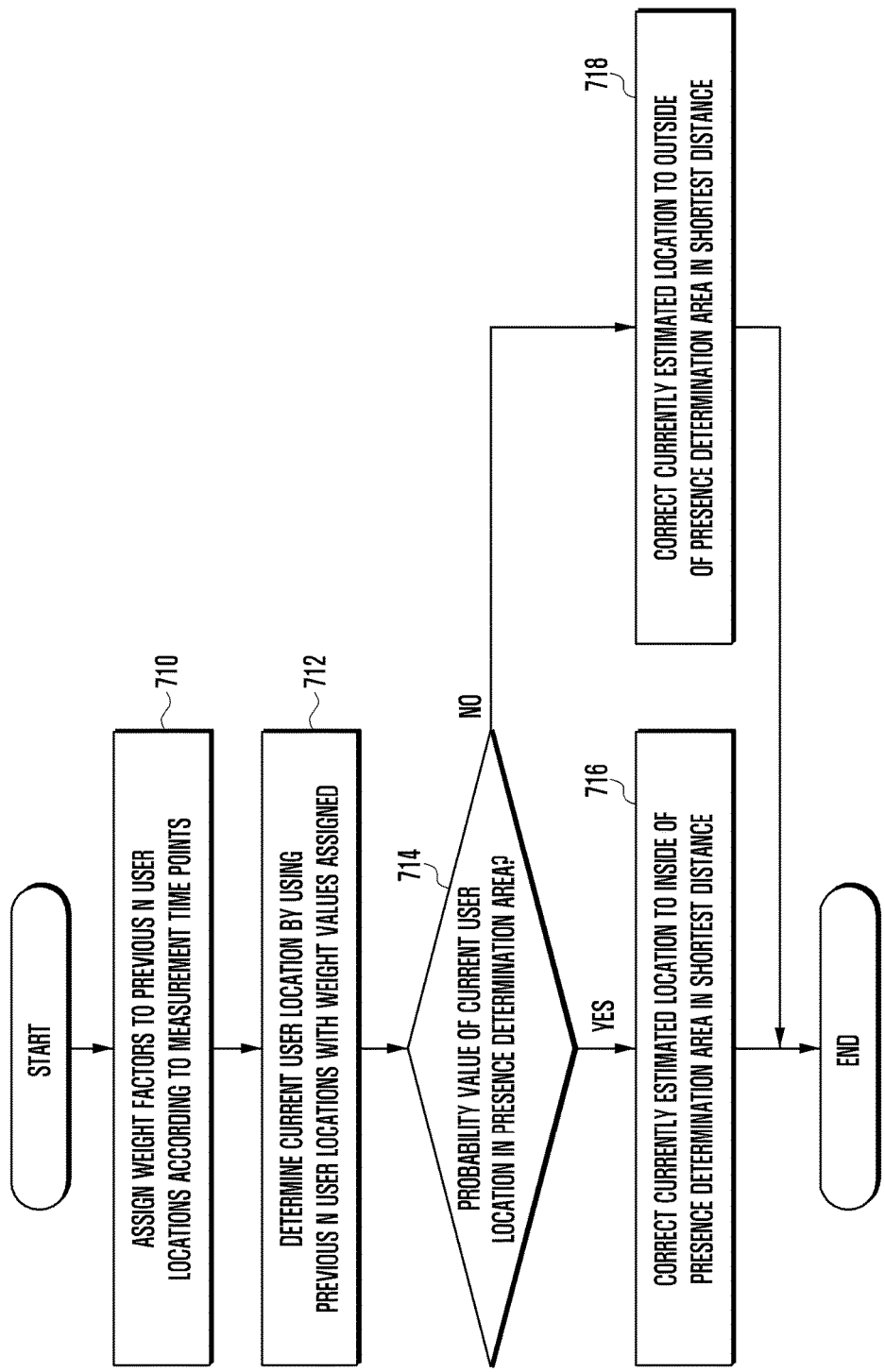
FIG. 8B is a flow diagram illustrating operations of escaping a boundary area according to another example embodiment of the present disclosure.

FIG. 8B is a flow diagram illustrating operations of escaping a boundary area according to another example embodiment of the present disclosure.

The operations shown in FIG. 8B may be performed by the electronic device 100 or the server 300. Hereinafter, it will be assumed that the electronic device 100 performs the operations of FIG. 8B.

This is a case in which the currently estimated and corrected location is in the boundary area of the presence determination area. Therefore, at step 710, the terminal controller 111 may read the previous N user locations from the terminal memory 105. For example, if N is 3, the terminal controller 111 may read the most recent three estimated and corrected locations among previous locations, except for the currently estimated and corrected location. In addition, at step 710, the terminal controller 111 may assign weight factors to the read previous locations according to measurement time points. For example, if three previous locations are read, and if the current time point is t, the weight factor for a time point of t−1 is 0.5, the weight factor for a time point of t−2 is 0.3, and the weight factor for a time point of t−3 is 0.2.

Here, the time point of t is the current time point, and the time point of t−1 is the nearest estimation and correction time point from the current time point among the previous time points. Also, the time point of t−2 is the nearest estimation and correction time point from the time point of t−1 among the previous time points before the time point of t−1. Similarly, the time point of t−3 is the nearest estimation and correction time point from the time point of t−2 among the previous time points before the time point of t−2. In this case, instead of using all the coordinates of the estimated location, only inside and outside information of the presence determination area may be used based on the estimated locations. For example, values determined to be inside or outside the presence determination area at the time points of t−1, t−2 and t−3, respectively, may be used.

In this example embodiment, it is assumed that a value of 0 is assigned to a case of the inside of the presence determination area and a value of 1 is assigned to a case of the outside of the presence determination area. Further, it is assumed that information respectively acquired at the time points of t−1, t−2 and t−3 indicates respectively the inside, the inside, and the outside of the presence determination area. Then, at step 710, the terminal controller 111 may perform calculation using Equation 1 given below.

Location value with weight factor assigned=(weight factor of *t*−1\*value of *t*−1)+(weight factor of *t*−2\*value of *t*−2)+(weight factor of *t*−3\*value of *t*−3)  [Equation 1]

In Equation 1, an asterisk '\*' means multiplication.

Accordingly, at step 710, the terminal controller 111 may calculate the above Equation as "(0.5\*0)+(0.3\*0)+(0.2\*1)" and then obtain a value of 0.2. Thereafter, at step 712, the terminal controller 111 may identify whether the user's location is inside or outside the presence determination area, by using the calculated value (i.e., the previous N user location values with weight factors applied) and a predetermined reference value (e.g., 0.5). Namely, the terminal controller 111 may compare both values at step 712 and then, based on a comparison result, determine whether to set a probability value of the user's current location to the inside or outside of the presence determination area.

In the above example, if the value calculated at step 710 is greater than the predetermined reference value, the terminal controller 111 may determine the user location to be in the outside. Otherwise, the terminal controller 111 may determine the user location to be in the inside. At this time, the terminal controller 111 does not correct the user location yet, and merely determines whether to further correct the currently estimated and corrected location to an inside location or an outside location.

Therefore, at step 714, the terminal controller 111 checks whether the probability value of the user's current location is in the presence determination area. If so, the terminal controller 111 performs step 716. Otherwise, the terminal controller 111 performs step 718.

If it is determined at step 714 that the probability value of the user's current location is in the presence determination area, the terminal controller 111 corrects the currently estimated and corrected location to the inside of the presence determination area in the shortest distance at step 716. On the other hand, if it is determined at step 714 that the probability value of the user's current location is out of the presence determination area, the terminal controller 111 corrects the currently estimated and corrected location to the outside of the presence determination area in the shortest distance at step 718. This makes it possible to exclude cases where the electronic device is located in the boundary area of the presence determination area. The above correction in the shortest distance may refer to an inward or outward movement in the x-axis direction (horizontal direction) or the y-axis direction (vertical direction) as described above with reference to FIGS. 7A and 7B.

The above-discussed operations in FIG. 8B may also be used in determining presence/absence in the presence determination area. Namely, it is possible to determine presence/absence in the presence determination area by assigning different weight factors to histories according to time.

FIGS. 9A to 9D are flow diagrams illustrating operations of determining presence or absence in a presence determination area according to various example embodiments of the present disclosure.

Figure 9A:
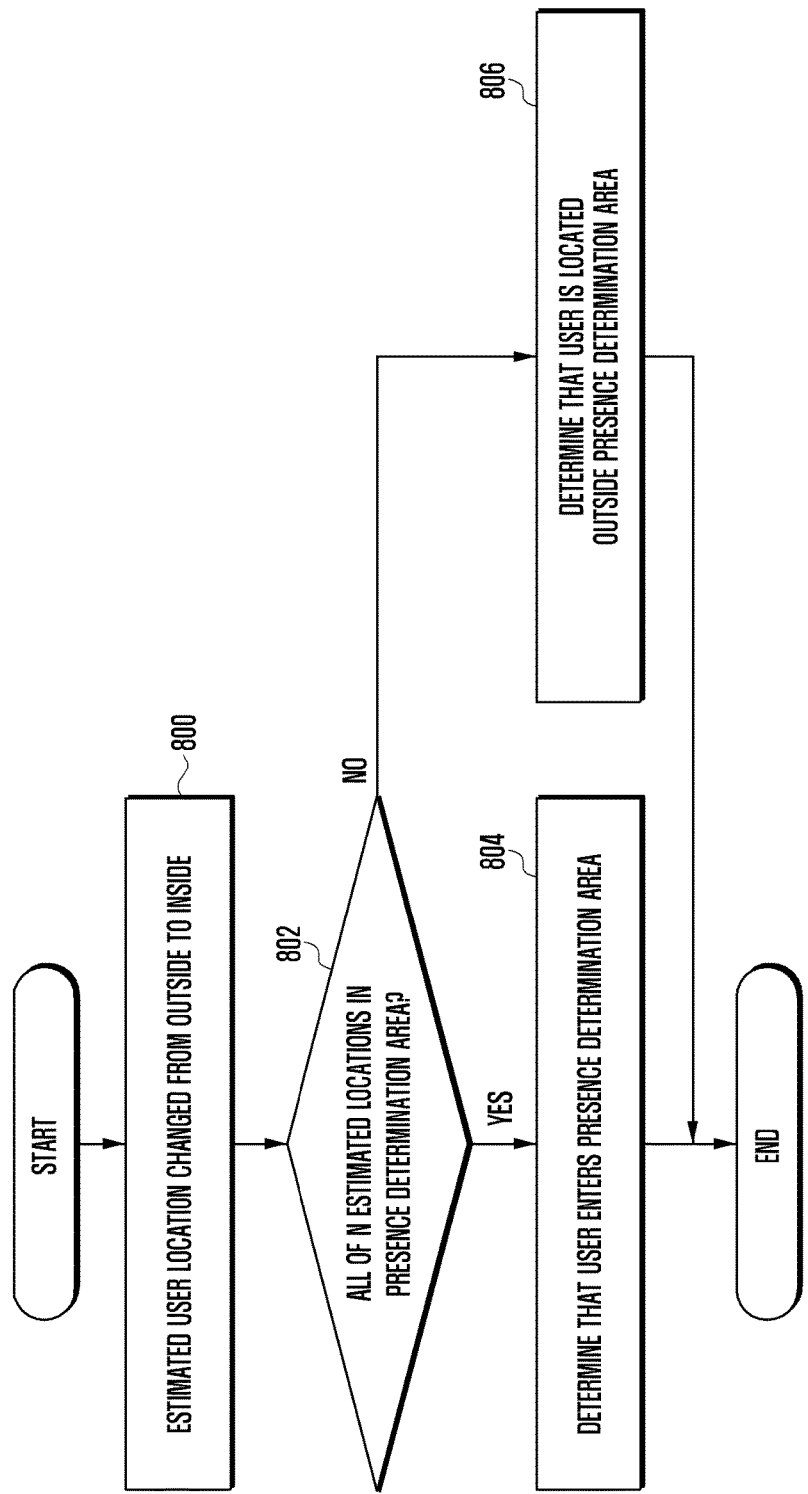

FIG. 9A shows a control flow of determining an entrance into the presence determination area according to an example embodiment of the present disclosure.

The operations shown in FIG. 9A may be performed by the electronic device 100 or the server 300. Hereinafter, it will be assumed that the electronic device 100 performs the operations of FIG. 9A.

At step 800, the terminal controller 111 checks whether the estimated user location is changed from outside to inside. Namely, it is checked whether the user location that has been detected outside is now detected inside. This happens in many cases.

First, this case may occur when the user actually enters from outside to inside. Second, although the user is located inside, this case may occur when the user location is initially measured as outside due to a certain error in estimation or correction and then when the user location is normally measured as inside. Third, although the user is actually located outside, this case may occur when the user location is measured as inside due to a certain error in estimation or correction.

Therefore, when the estimated user location is changed from outside to inside at step 800, the terminal controller 111 continuously checks a predetermined number (N) of estimated locations at step 802 after the change of the estimated user location. Namely, this example embodiment shown in FIG. 9A is to defer the determination of the entrance into the presence determination area until the estimated locations are detected a predetermined number of times, without determining immediately the entrance into the presence determination area by a single change only. Here, the predetermined number (N) may have a value of two or more, and may be set differently depending on whether a quick determination is required or not.

For example, in case of controlling lighting in the nighttime or in a dark environment, a quick determination is needed. Therefore, in this case, step 802 may be skipped or a small number of checks such as two times may be performed. On the other hand, in case of controlling the same lighting in the daytime or in a bright environment, an accurate determination is needed rather than a quick determination. Therefore, in this case, the predetermined number (N) may be set to a greater value such as four times or five times.

If it is determined at step 802 that all or most of the predetermined number of estimated locations are in the presence determination area, the terminal controller 111 performs step 804. Otherwise, the terminal controller 111 performs step 806. Here, the term 'most' may mean 50%, 70%, etc. for example. If the predetermined number (N) is 3, the term 'most' may indicate two. If the predetermined number (N) is 5, the term 'most' may indicate three. If the predetermined number (N) is an even number, the determination may be difficult. So, it is better to avoid an even number except for a case where two checks are inevitably needed for a quick determination. If the predetermined number (N) is 2, and if two determinations do not match, any other method such as previous locations or history information may be further used.

At step 804, the terminal controller 111 may determine that the user enters the presence determination area, and then determine the user location. On the other hand, at step 806, the terminal controller 111 may determine that the user is located outside the presence determination area, and then determine the location thereof.

Figure 9B:
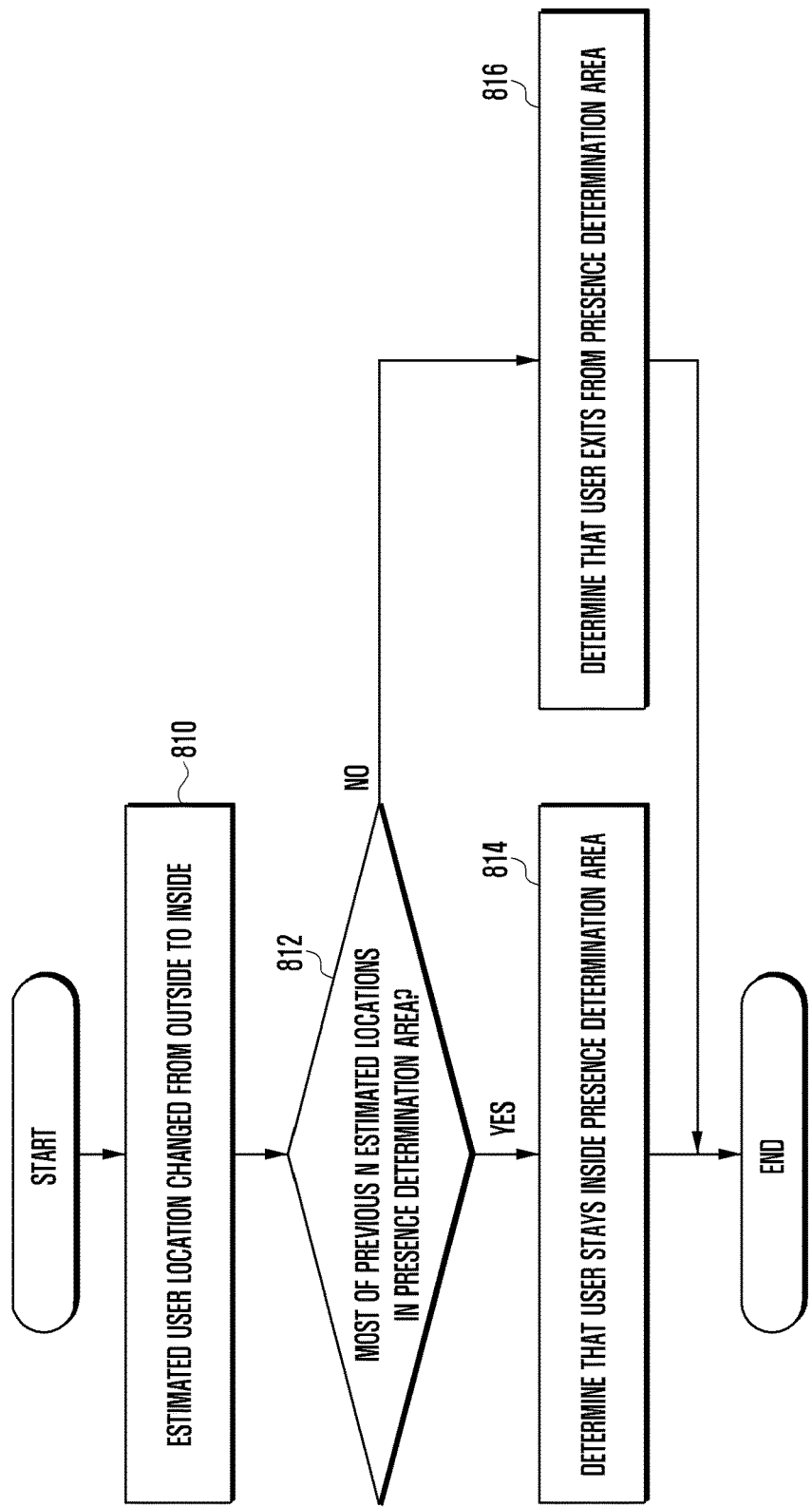

FIG. 9B shows a control flow of determining a presence in a presence determination area after an entrance into the presence determination area by using a history according to another example embodiment of the present disclosure.

At step 810, the terminal controller 111 checks whether the estimated user location is changed from outside to inside. Namely, it is checked whether the user location that has been detected outside is now detected inside. This happens in three cases as described above.

Step 810 means a state of determining that the user is located inside. Therefore, step 810 may be the same as step 804 of FIG. 9A described above. Thereafter, at step 812, the terminal controller 111 further checks a predetermined number (N) of estimated locations after it is determined that the estimated user location is inside. Namely, this embodiment shown in FIG. 9B is to check a previous history by a predetermined number of times rather than determining immediately the entrance into the presence determination area by a single change only. Here, the predetermined number (N) may have a value of two or more.

If it is determined at step 812 that all or most of the predetermined number of estimated locations are in the presence determination area, the terminal controller 111 performs step 814. Otherwise, the terminal controller 111 performs step 816. Here, the term 'most' may mean 50%, 70%, etc. for example. If the predetermined number (N) is 3, the term 'most' may indicate two. If the predetermined number (N) is 5, the term 'most' may indicate three. If the predetermined number (N) is an even number, the determination may be difficult. So, it is better to avoid an even number.

At step 814, the terminal controller 111 may determine that the user is continuously staying inside the presence determination area, and then determine the user location. On the other hand, at step 816, the terminal controller 111 may determine that the user is located outside the presence determination area, and then determine the location thereof.

Figure 9C:
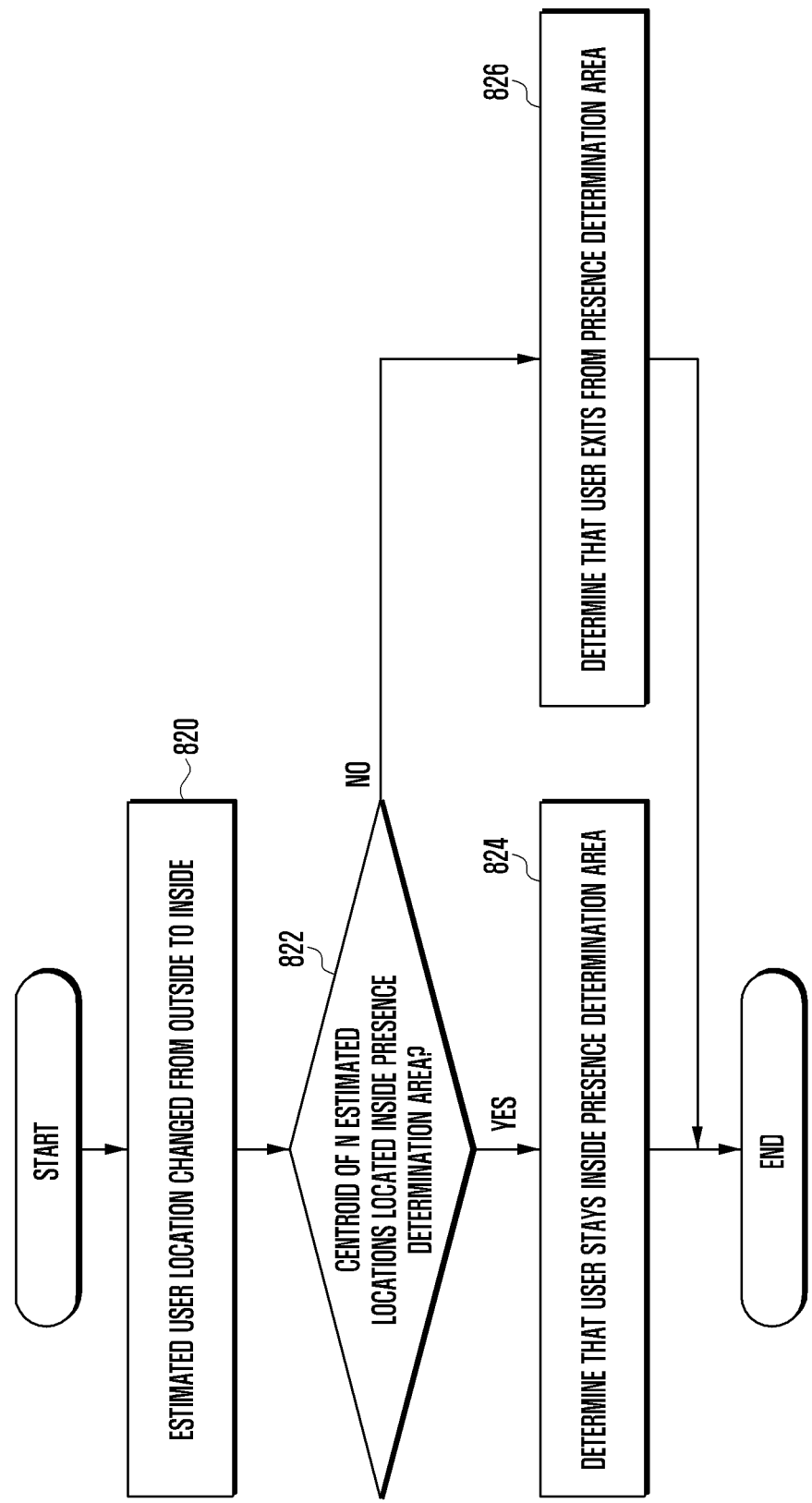

In addition to the method of FIG. 9B, the method of FIG. 9C may also be used. FIG. 9C shows a control flow of determining a presence in or an absence from a presence determination area after an entrance into the presence determination area by using a history according to still another example embodiment of the present disclosure.

At step 820, the terminal controller 111 checks whether the estimated user location is changed from outside to inside. Namely, it is checked whether the user location that has been detected outside is now detected inside. Step 820 means a state of determining that the user is located inside. Therefore, step 820 may be the same as step 804 of FIG. 9A described above. This happens in three cases as described above.

Thereafter, at step 822, the terminal controller 111 checks whether a centroid of a predetermined number (N) of estimated locations is located inside the presence determination area. This is to prevent the estimated user location from being erroneously detected inside or outside the presence determination area due to the change of signal strength, the error of sensing values, or the like even though the user actually remains inside.

Therefore, the terminal controller 111 may calculate the centroid of the determined user locations after the entrance into the presence determination area, and then check whether the calculated centroid is located inside the presence determination area. The calculation of the centroid may use Equation 2 given below.

$$(x, y) = \left( \frac{\sum_{i=1}^{n} x_i}{n}, \frac{\sum_{i=1}^{n} y_i}{n} \right) \quad \text{[Equation 2]}$$

In Equation 2, the left side denotes the value of centroid, whereas xi and yi of the right side respectively denote the coordinates of the x-axis (or latitude) and the coordinates of the y-axis (or longitude) at each time point. Therefore, it is possible to correct the location value by accumulating a predetermined number (n) of values and then obtaining an average thereof.

This will be described in detail with reference to FIG. 10.

Figure 10:
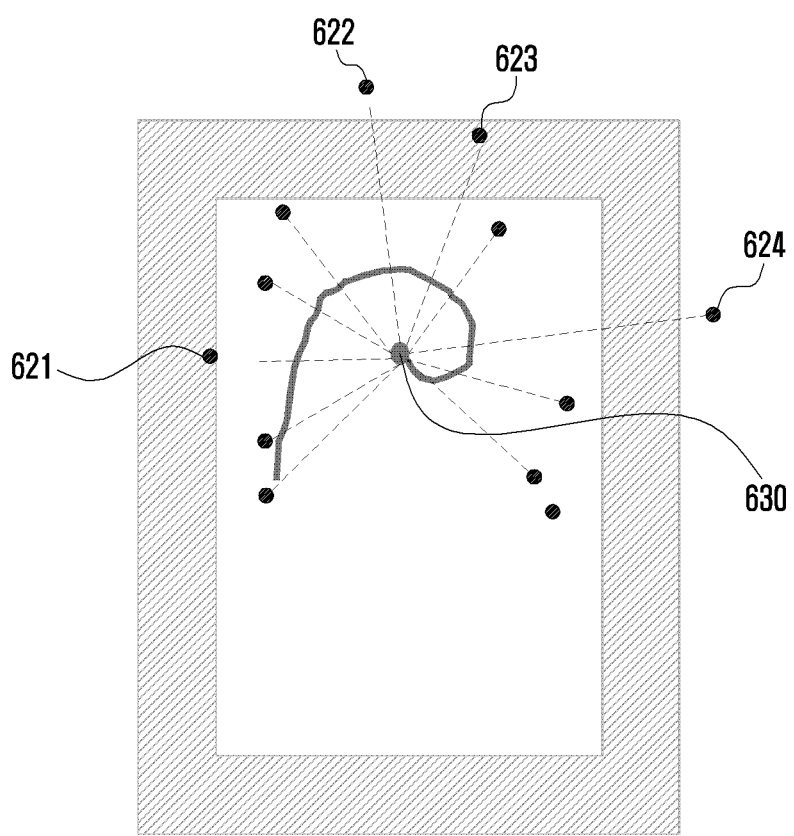
FIG. 10 is a diagram illustrating the use of a centroid in determining presence or absence in a presence determination area according to an example embodiment of the present disclosure.

FIG. 10 is a diagram illustrating the use of a centroid in determining presence or absence in a presence determination area according to an example embodiment of the present disclosure.

FIG. 10 shows a part of FIG. 7A described above. In FIG. 10, the user may be located within the presence determination area, may move, or may be located at a specific place.

However, the signal strength measured in the electronic device 100 may vary from time to time due to various environmental changes such as a person's movement, changes in signal strength of other electronic devices, and variations of obstacles between the wireless communication device and the electronic device. When the measured signal strength is varied for such reasons, error is inevitably generated because the initial location estimation is performed by measuring the signal strength.

Namely, as shown in FIG. 10, even when the user is staying in the presence determination area or moving only within the presence determination area, the user location may be detected from the boundary area or from the outside of the presence determination area as indicated by reference numerals 621, 622, 623, and 624.

In case of a time point 621, the centroid may be calculated using a current value (i.e., the coordinates of 621) and the previous two values. Similarly, in case of a time point 622, the centroid may be calculated using a current value (i.e., the coordinates of 622) and the previous five values. In the end, this calculation converges on the centroid 630.

Therefore, if the user is actually located within the presence determination area, the error may be corrected easily. However, if the user actually moves along the street or the hallway, the use of the centroid may cause a considerable error. Therefore, it is desirable to use the centroid in the following cases.

For example, the control method shown in FIG. 9C may reduce an error when a meeting is reserved for one hour in a meeting room and all or some of attendees are attending the meeting in progress. For example, when the meeting room is reserved from 9:00 am to 10:00 am, it is possible to prevent a presenter's location from being suddenly changed to the outside of the meeting room or prevent an unregistered user's location from being suddenly changed from outside to inside. In another example, it is preferable to use the centroid when determining the presence or absence in a specific space where persons are staying rather than in a passage where persons are moving frequently.

Returning to FIG. 9C, if it is determined at step 822 that the calculated centroid is inside the presence determination area, the terminal controller 111 performs step 824. Otherwise, the terminal controller 111 performs step 826.

At step 824, the terminal controller 111 may determine that the user is continuously staying inside the presence determination area, and then determine the user location. On the other hand, at step 826, the terminal controller 111 may determine that the user is located outside the presence determination area, and then determine the location thereof.

FIG. 9D shows a control flow of determining presence/absence within a presence determination area according to yet another example embodiment of the present disclosure.

At step 830, the terminal controller 111 checks whether the estimated user location is changed from outside to inside. Namely, it is checked whether the user location that has been detected outside is now detected inside. This happens in three cases as described above.

Thereafter, at step 832, the terminal controller 111 may check whether the signal strength from the wireless communication device located inside the presence determination area is greater than a threshold. If so, the terminal controller 111 performs step 834. Otherwise, the terminal controller 111 performs step 836.

FIG. 9D corresponds to cases where the specific wireless communication devices are installed in the presence determination area such as a meeting room and also there is the related signal strength information. Therefore, this case may be applicable when it is possible to determine presence/absence through only the signal strength from the wireless communication devices. For example, the control method shown in FIG. 9D may be applied to a small meeting room, a hotel room, a classroom, etc. which allow the detection with only signal strength from the wireless communication devices installed therein.

At step 834, the terminal controller 111 may determine that the user is continuously staying inside the presence determination area, and then determine the user location. On the other hand, at step 836, the terminal controller 111 may determine that the user is located outside the presence determination area, and then determine the location thereof.

The above-discussed example embodiments of FIGS. 9A to 9D may be used either complementarily or selectively using as needed so as to correct again errors in the estimated and corrected location. This makes it possible to more accurately determine the presence/absence in the presence determination area.

Figure 11A:
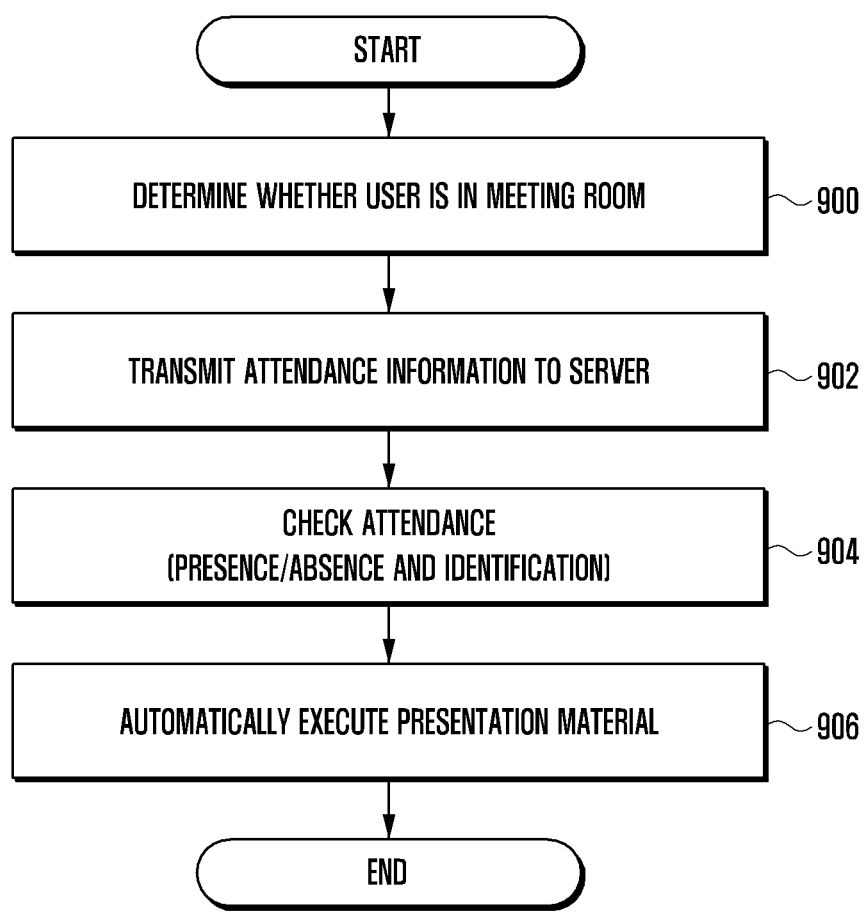
FIGS. 11A, 11B, and 11C are flow diagrams illustrating operations of providing a service at a server in case of presence in a presence determination area according to various example embodiments of the present disclosure.
Figure 11B:
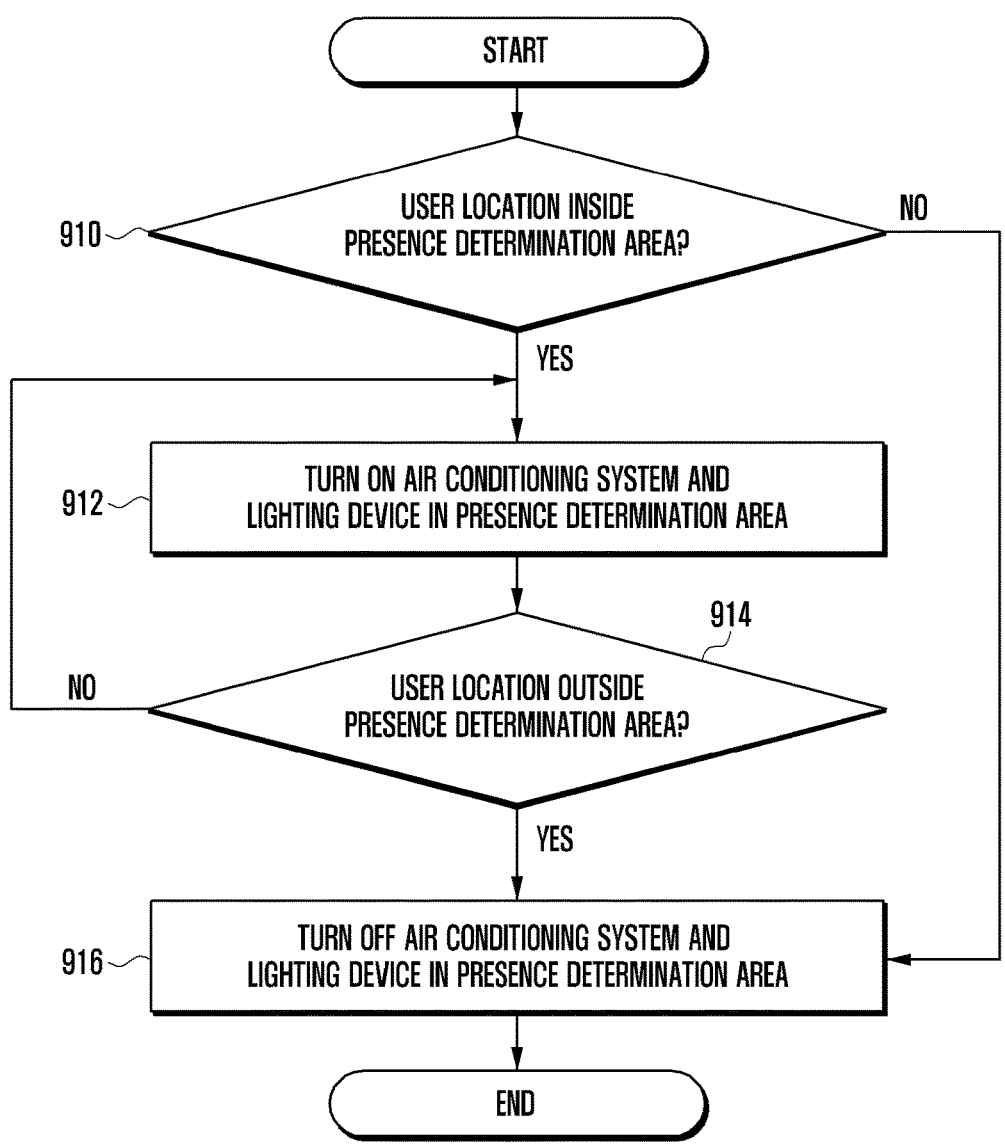
Figure 11C:
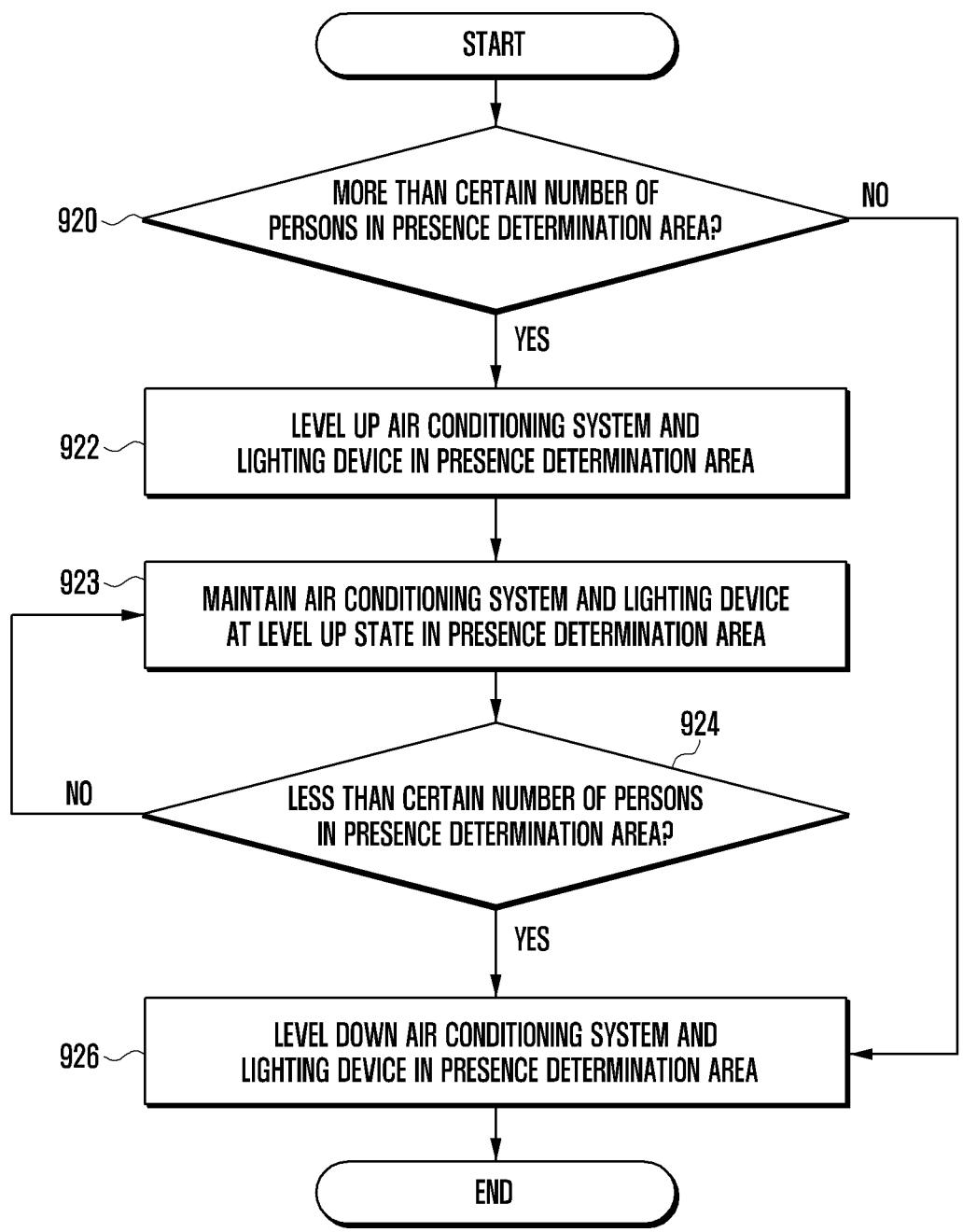

FIGS. 11A to 11C are flow diagrams illustrating operations of providing a service at a server in case of presence in a presence determination area according to various example embodiments of the present disclosure.

FIG. 11A shows a control flow of controlling a meeting room by determining presence/absence in the presence determination area according to an example embodiment of the present disclosure.

FIG. 11A may correspond to a case in which a certain service is registered in the meeting room as described above. At step 900, the electronic device 100 carried or worn by the user may determine whether the user is in the meeting room, by using the above-described method. In this case, the meeting room itself may be the presence determination area. Therefore, the presence in the meeting room may be known by determining whether the user enters the meeting room.

Then, at step 902, the electronic device 100 may transmit, to the server 300, attendance information, namely, information about the user having the electronic device 100 or identification information of the electronic device. In this case, it is assumed that the number of attendees, reservation time information of the meeting room, and prepared presentation material information, and the like are already registered in the server memory 303 of the server 300. Then, the server controller 307 of the server 300 may receive the attendance information from the electronic device 100 through the server network interface 301.

At step 904, the server controller 307 may check whether information about whether a preregistered attendee is in the meeting room is received from the electronic devices of all or main attendees.

If it is determined at step 904 that all or main attendees are present in the meeting room defined as the presence determination area, the server controller 307 may control at step 906 a presentation device (not shown) of the meeting room to automatically execute a presentation material registered in the server memory 303. For example, the presentation material may be executed to be displayed on the screen of the meeting room.

FIG. 11B shows a control flow of automatically controlling the lighting device and the air conditioning system in the presence determination area according to another example embodiment of the present disclosure.

At step 910, the server controller 307 may check whether the user location is inside the presence determination area. For example, each office room, each hotel room, a specific region of factory, each classroom, each section of hallway, etc. may be defined as one presence determination area. This may be applied to both a physically distinguishable region and a physically undistinguishable region as described above with reference to FIG. 7C. In the physically undistinguishable region, the presence determination area may be defined together with the thickness of the boundary area. Also, even in the physically distinguishable region, the thickness of the boundary area may be set as described above.

In the above situation, the server controller 307 may determine at step 910 whether the user location is inside the presence determination area. As discussed above, this determination may be performed by the electronic device 100 and then reported to the server 300. Alternatively, this determination may be performed by the server 300 that receives information necessary for estimation and correction from the electronic device 100. If it is determined at step 910 that the user location is inside the presence determination area, the server controller 307 may control at step 912 the air conditioning system and the lighting device in the presence determination area to be turned on. If it is determined at step 910 that the user location is not inside the presence determination area, the server controller performs step 916, discussed below.

Thereafter, at step 914, the server controller 307 checks whether the user location is detected outside the presence determination area. This checking operation may be similar with that performed at step 910. However, step 910 is to check whether the user location is inside the presence determination area, whereas step 914 is to check whether the user location is outside the presence determination area. If the user location is detected outside the presence determination area, the server controller 307 may control at step 916 the air conditioning system and lighting device in the presence determination area to be turned off. If the user location is not detected outside the presence determination area, the server controller continues to perform step 912.

FIG. 11C shows a control flow of controlling the lighting device and the air conditioning system by determining presence/absence in the presence determination area according to still another example embodiment of the present disclosure.

At step 920, the server controller 307 may check whether more than certain number of persons are present inside the presence determination area. This may correspond to a case in which the electronic device of each user indicates its presence in the same presence determination area.

If it is determined at step 920 that more than certain number of persons are present, the server controller 307 may, at step 922, level up the air conditioning system and the lighting device in the presence determination area. For example, if the air conditioning system is set to have three stages and is currently operating at the second stage, the server controller 307 may enable the air conditioning system to operate at the third stage. Also, the server controller 307 may increase lighting brightness according to the number of persons. Thereafter, at step 923, the server controller maintains the air conditioning system and lighting device at the level up state in the presence determination area.

Meanwhile, as described above, the presence determination area may be set to any place where the present disclosure can be applied by the administrator or operator who wants to define the presence determination area. In case of FIG. 11C, the presence determination area may be set for each zone in a wide space such as a factory or a company. Also, in case of a movie theater or the like, this control method may be applied only to air conditioning, but not lighting.

The number of persons may be set in various stages. For example, if a maximum of twenty persons can be accommodated in the presence determination area, the air conditioning system and/or the lighting device may be differently controlled according to the number of persons such as fifteen persons, ten persons, five persons, and the like.

Thereafter, at step 924, the server controller 307 checks whether less than certain number of persons are present inside the presence determination area. If so, the server controller 307 may, at step 926, level down the air conditioning system and the lighting device in the presence determination area (e.g., from operating at the third stage to operating at the second stage). If not, the server controller 307 maintains the current air conditioning and light device settings are step 923.

Hereinbefore, some example embodiments are described using control flow diagrams. However, the present disclosure can be applied to a variety of cases as described above. Additionally, in various cases, it is possible to provide a variety of services by determining whether the user is present in or absent from a certain area defined as the presence determination area.

Figure 12A:
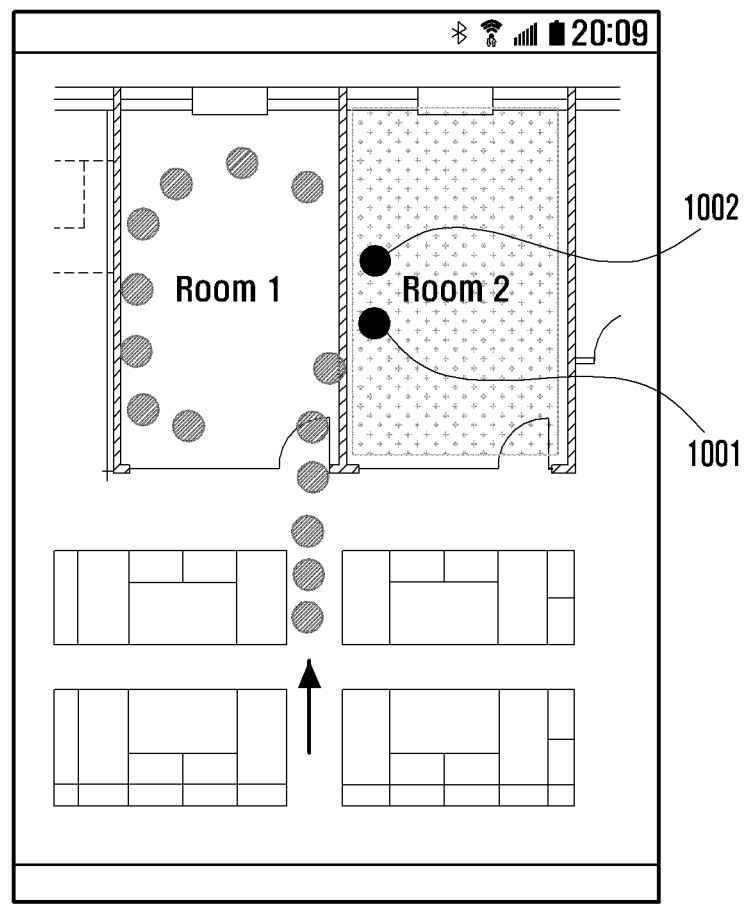
FIGS. 12A and 12B are diagrams illustrating a comparison between a case where the present disclosure is applied and a case where the present disclosure is not applied.
Figure 12B:
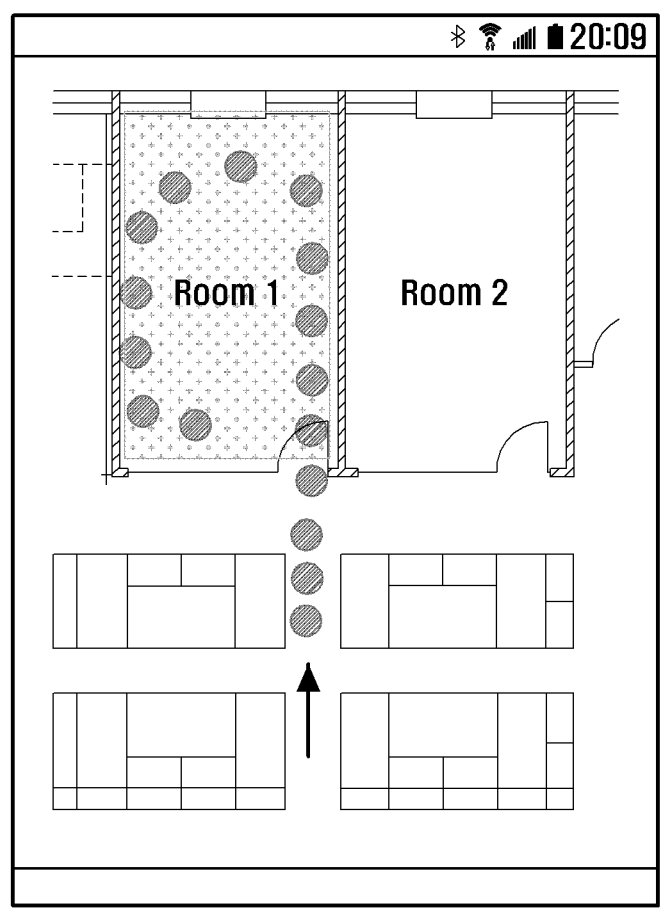

FIGS. 12A and 12B are diagrams illustrating a comparison between a case in which the present disclosure is applied and a case in which the present disclosure is not applied.

FIG. 12A shows a case in which two rooms (Room 1 and Room 2) are defined as different presence determination areas and the user enters the room 1. In this case to which the present disclosure is not applied, the reported locations may include erroneous locations 1001 and 1002 that belong to the other room. This is only a simple example, and more considerable errors may actually occur.

In contrast, in case of performing the location correction according to the present disclosure, it is possible to prevent abrupt change of location as shown in FIG. 12B. In addition, incorrect movement from a first presence determination area to a second presence determination area does not occur. Therefore, the present disclosure may detect more accurately a user's presence/absence from the presence determination area. Further, based on a result of detecting such presence/absence, it is possible to provide an adequate service to the user.

While the present disclosure has been particularly shown and described with reference to various non-limiting example embodiments thereof, it will be readily understood that these embodiment are provided by way of illustration and example only. It will be understood by those skilled in the art that various changes in form and details may be made therein without departing from the subject matter and scope of the present disclosure.

What is claimed is:

1. A method for determining a presence or absence of an electronic device in a specific space at the electronic device, comprising:
   estimating a current location based on strength of signals received from a plurality of wireless communication devices;
   correcting the estimated location by using movement information acquired through a sensor to generate a first corrected location;
   correcting the first corrected location by using information about a boundary area of a predefined presence determination area to generate a second corrected location; and
   determining the presence or absence in the presence determination area, based on the second corrected location, wherein, when the first corrected location exists in the boundary area, the correcting of the first corrected location includes generating the second corrected location to be outside the boundary area.

2. The method of claim 1, wherein the boundary area information includes width information for distinguishing between an outside and an inside of the presence determination area, and
wherein the width information is determined according to an accuracy and a response time required in the determining the presence or absence.

3. The method of claim 1, wherein the correcting of the first corrected location includes correcting the first corrected location to an outside or an inside of the presence determination area by using previously acquired location history information, when the first corrected location exists in the boundary area.

4. The method of claim 3, wherein the correcting of the first corrected location further includes:
acquiring a plurality of pieces of location history information nearest to a current time point in the previously acquired location history information; and
correcting the first corrected location to an outside or an inside of the presence determination area, based on the presence or absence in the presence determination area with respect to the acquired plurality of pieces of nearest location history information.

5. The method of claim 3, wherein the correcting of the first corrected location further includes:
acquiring a plurality of pieces of latest location history information in the previously acquired location history information;
assigning different weight factors to the acquired plurality of pieces of latest location history information in a time order such that a higher weight factor is assigned to the location history of a time point closer to a current time point; and
correcting the first corrected location to an outside or an inside of the presence determination area, based on the plurality of pieces of latest location history information to which the weight factors are assigned.

6. The method of claim 1, further comprising:
before determining the presence or absence in the presence determination area, determining whether the electronic device enters the presence determination area;
further determining at least once whether the electronic device enters the presence determination area, when a result of determining the presence or absence in the presence determination area, based on the second corrected location, is different from presence/absence information included in latest location history information; and
finally determining whether the electronic device enters the presence determination area, based on a result of the further determining and two or more pieces of previous history information continuous from a time point of the further determining.

7. The method of claim 6, further comprising:
performing location estimation and correction for a predetermined number of times after the finally determining; and
determining that the electronic device is present in the presence determination area, when the corrected location is determined to be inside the presence determination area for a number of times that is greater than a threshold.

8. The method of claim 7, further comprising:
displaying predetermined information or information received from a server on a display according to a result of determining the presence/absence in the presence determination area.

9. The method of claim 8, wherein the information displayed on the display includes one of augmented reality game information and virtual object information.

10. The method of claim 6, further comprising:
performing location estimation and correction for a predetermined number of times after the finally determining;
calculating a centroid of the plurality of corrected locations; and
determining whether the electronic device is present in the presence determination area, based on the calculated centroid.

11. An electronic device for determining a presence or absence thereof in a specific space, comprising:
communication circuitry configured to communicate with a server and to measure strength of signals received from a plurality of wireless communication devices;
one or more sensors configured to sense movement information of the electronic device;
a memory configured to store presence determination area information, location history information, and current location information; and
a controller configured to:
estimate a current location based on the signal strength measured by the communication circuitry,
correct the estimated location by using the movement information acquired by the sensor unit to generate a first corrected location,
correct the first corrected location by using information about a boundary area of a predefined presence determination area stored in the memory to generate a second corrected location, and
determine the presence or absence in the presence determination area, based on the second corrected location,
wherein, the controller is configured to generate the second corrected location to be outside the boundary area when the first corrected location exists in the boundary area.

12. The electronic device of claim 11, wherein the boundary area information includes width information for distinguishing between an outside and an inside of the presence determination area, and
wherein the width information is determined according to an accuracy and a response time required in the determining the presence or absence.

13. The electronic device of claim 12, wherein the controller is further configured to:
correct the first corrected location to an outside or an inside of the presence determination area by using the location history information stored in the memory when the first corrected location exists in the boundary area, and
control the memory to store the second corrected location.

14. The electronic device of claim 13, wherein the controller is further configured to:
acquire a plurality of pieces of location history information nearest to a current time point in the location history information stored in the memory,
correct the first corrected location to an outside or an inside of the presence determination area, based on the presence or absence in the presence determination area with respect to the acquired plurality of pieces of nearest location history information, and control the memory to store the second corrected location.

15. The electronic device of claim 11, wherein the controller is further configured to:

determine whether the electronic device enters the presence determination area, before determining the presence or absence in the presence determination area, further determine at least once whether the electronic device enters the presence determination area, when a result of the determining the presence or absence in the presence determination area, based on the second corrected location, is different from presence/absence information included in the location history information stored in the memory, and finally determine whether the electronic device enters the presence determination area, based on a result of the further determination and two or more pieces of previous history information continuous from a time point of the further determination.

16. The electronic device of claim 15, wherein the controller is further configured to:

perform location estimation and correction for a predetermined number of times after the finally determining, and determine that the electronic device is present in the presence determination area, when the corrected location is determined to be inside the presence determination area for a number of times that is greater than a threshold.

17. The electronic device of claim 16, further comprising:

a display, wherein the controller is further configured to control the display to display information stored in the memory or information received from the server according to a result of presence/absence determination for the presence determination area.

18. The electronic device of claim 17, wherein the display comprises a touch screen, wherein the touch screen displays the information according to the result of presence/absence determination, and wherein the controller is further configured to perform control in response to a user input corresponding to the displayed information.

19. The electronic device of claim 18, wherein the user input is for a command for controlling at least one external device.

20. The electronic device of claim 15, wherein the controller is further configured to:

perform location estimation and correction for a predetermined number of times after the finally determining, calculate a centroid of the plurality of corrected locations, and determine whether the electronic device is present in the presence determination area, based on the calculated centroid.

* * * * *